US012581002B2

(12) United States Patent
Kim et al.

(10) Patent No.: US 12,581,002 B2
(45) Date of Patent: Mar. 17, 2026

(54) ELECTRONIC DEVICE AND ELECTRONIC DEVICE OPERATION METHOD

(71) Applicant: Samsung Electronics Co., Ltd., Gyeonggi-do (KR)

(72) Inventors: Youngrog Kim, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 18/326,288

(22) Filed: May 31, 2023

(65) Prior Publication Data

US 2023/0308532 A1 Sep. 28, 2023

Related U.S. Application Data

(63) Continuation of application No. PCT/KR2021/017276, filed on Nov. 23, 2021.

(30) Foreign Application Priority Data

Dec. 4, 2020 (KR) ........................ 10-2020-0168640
Mar. 15, 2021 (KR) ........................ 10-2021-0033566

(51) Int. Cl.
  *H04M 1/02* (2006.01)
  *G06F 1/16* (2006.01)
  *G09G 5/393* (2006.01)

(52) U.S. Cl.
  CPC ........ *H04M 1/0237* (2013.01); *G06F 1/1624* (2013.01); *G09G 5/393* (2013.01); *G06F 1/1652* (2013.01); *G09G 2360/18* (2013.01)

(58) Field of Classification Search
  CPC ..... H04M 1/0237; G09G 5/393; G06F 1/1624
  See application file for complete search history.

(56) References Cited

U.S. PATENT DOCUMENTS

| | | | |
|---|---|---|---|
| 8,810,588 B2 | 8/2014 | Kashimoto | |
| 10,013,955 B2 | 7/2018 | Oh et al. | |
| 10,304,417 B2 | 5/2019 | Park et al. | |
| 10,365,690 B2 | 7/2019 | In et al. | |

(Continued)

FOREIGN PATENT DOCUMENTS

| | | |
|---|---|---|
| CN | 103530016 A | 1/2014 |
| CN | 107316605 A | 11/2017 |

(Continued)

OTHER PUBLICATIONS

Extended European Search Report dated Feb. 20, 2024 for EP Application No. 21900902.4.

(Continued)

*Primary Examiner* — Myron Wyche

(74) *Attorney, Agent, or Firm* — Nixon & Vanderhye P.C.

(57) ABSTRACT

An electronic device may include a housing, a motor, a display including a region that, by using at least the motor, is expandable to the outside of the housing or reducible to the inside of the housing a memory, and a processor, wherein the memory may store instructions that, when executed, may cause the processor to: execute an application; expand, in response to a specified event, the region of the display to the outside of the housing at a specified reference speed by using the motor; recognize, during the expansion of the region, a time required to display an execution screen of the application on the display; adjust the speed of the motor on the basis of the required time; and display, on the display, the execution screen of the application corresponding to the expanded state of the display during the expansion of the region on the basis of the adjusted speed of the motor.

21 Claims, 18 Drawing Sheets

(56) References Cited

U.S. PATENT DOCUMENTS

| | | | |
|---|---|---|---|
| 10,490,169 B2 | 11/2019 | Oh et al. | |
| 10,613,809 B2 | 4/2020 | Lee et al. | |
| 10,691,174 B2 | 6/2020 | In et al. | |
| 10,706,811 B2 | 7/2020 | Zhang | |
| 10,747,269 B1 | 8/2020 | Choi et al. | |
| 10,817,022 B2 | 10/2020 | Cho et al. | |
| 11,042,192 B2 | 6/2021 | Choi et al. | |
| 11,062,683 B2 | 7/2021 | Park et al. | |
| 11,126,223 B2 | 9/2021 | Seo et al. | |
| 11,238,832 B2 | 2/2022 | An et al. | |
| 11,409,488 B2 | 8/2022 | Kwon et al. | |
| 2008/0307387 A1 | 12/2008 | Yoon et al. | |
| 2016/0307545 A1* | 10/2016 | Lee | G09G 5/346 |
| 2017/0140504 A1 | 5/2017 | Jeong et al. | |
| 2017/0309226 A1* | 10/2017 | In | G09G 3/035 |
| 2019/0302851 A1 | 10/2019 | In et al. | |
| 2020/0221586 A1 | 7/2020 | Gao et al. | |
| 2020/0333834 A1 | 10/2020 | Seo et al. | |
| 2021/0158783 A1 | 5/2021 | Lee et al. | |
| 2022/0004225 A1 | 1/2022 | Seo et al. | |

FOREIGN PATENT DOCUMENTS

| | | | | |
|---|---|---|---|---|
| CN | 107980158 A | 5/2018 | | |
| CN | 110730985 A | 1/2020 | | |
| CN | 111801646 A | 10/2020 | | |
| CN | 111868817 A | 10/2020 | | |
| KR | 20080052308 A | 6/2008 | | |
| KR | 20120069422 A | 6/2012 | | |
| KR | 20160123201 A | 10/2016 | | |
| KR | 20170043347 A | 4/2017 | | |
| KR | 20170122313 A | 11/2017 | | |
| KR | 20180134236 | * 12/2018 | | G09F 11/16 |
| KR | 20180134236 A | 12/2018 | | |
| KR | 10-2020-0101306 A | 8/2020 | | |
| KR | 2020-0111519 A | 9/2020 | | |
| KR | 20200122106 A | 10/2020 | | |
| KR | 102222338 B1 | 3/2021 | | |

OTHER PUBLICATIONS

Korean Rejection Decision dated Apr. 23, 2025 for KR Application No. 10-2021-0033566.

Korean Office Action dated Oct. 8, 2024 for KR Application No. KR 10-2021-0033566.

European Office Action dated Oct. 20, 2025 for EP Application No. 21900902.4.

Chinese Office Action dated Nov. 20, 2025 for CN Application No. 202180081550.9.

* cited by examiner

200

210 — MOTOR

220 — DISPLAY

240
PROCESSOR

230
MEMORY

| | |
|---|---|
| Input scan | ← 505 |
| Input firmware | ← 510 |
| OS | ← 515 |
| Runtime | ← 520 |
| Framework | ← 525 |
| App | ← 530 |
| Rendering | ← 535 |
| Compositing | ← 540 |
| Display frame | ← 550 |
| Display change | ← 560 |
| Total latency | ← 570 |

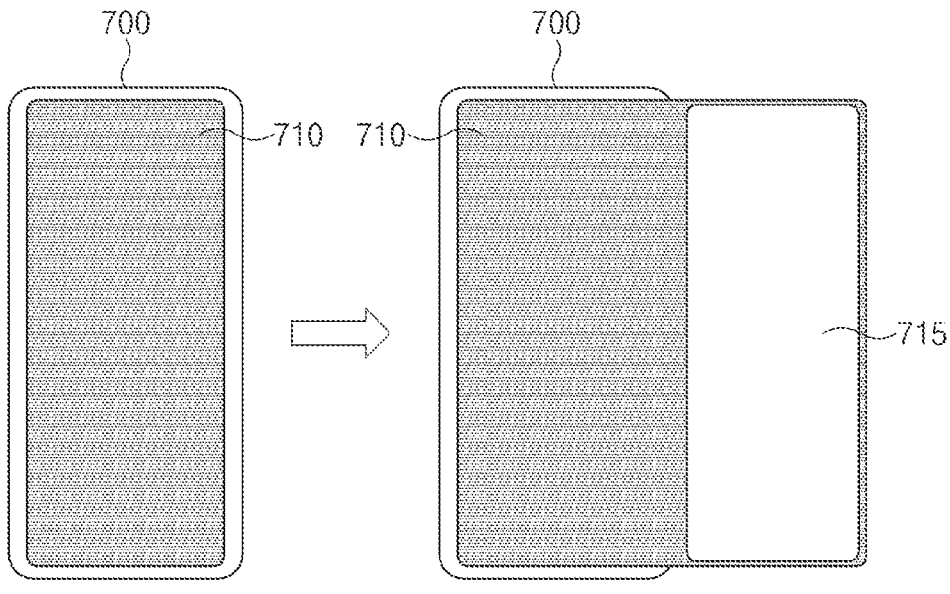
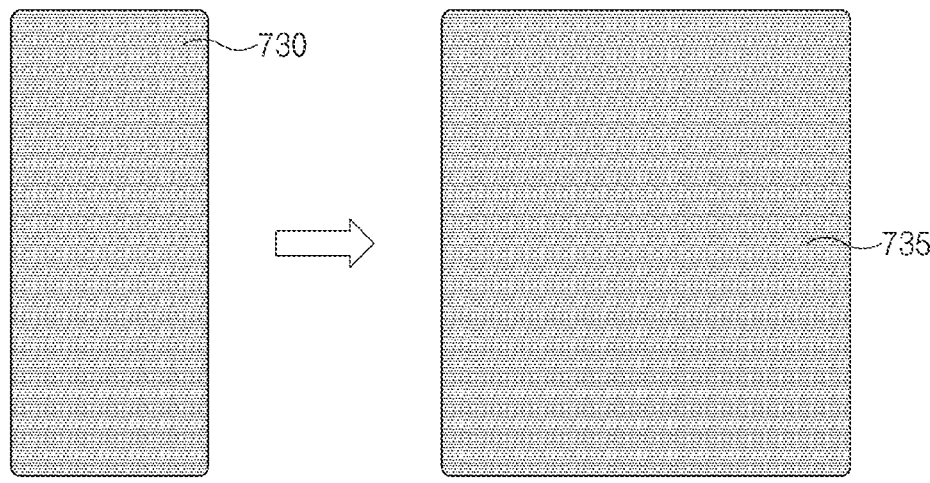
FIG.7

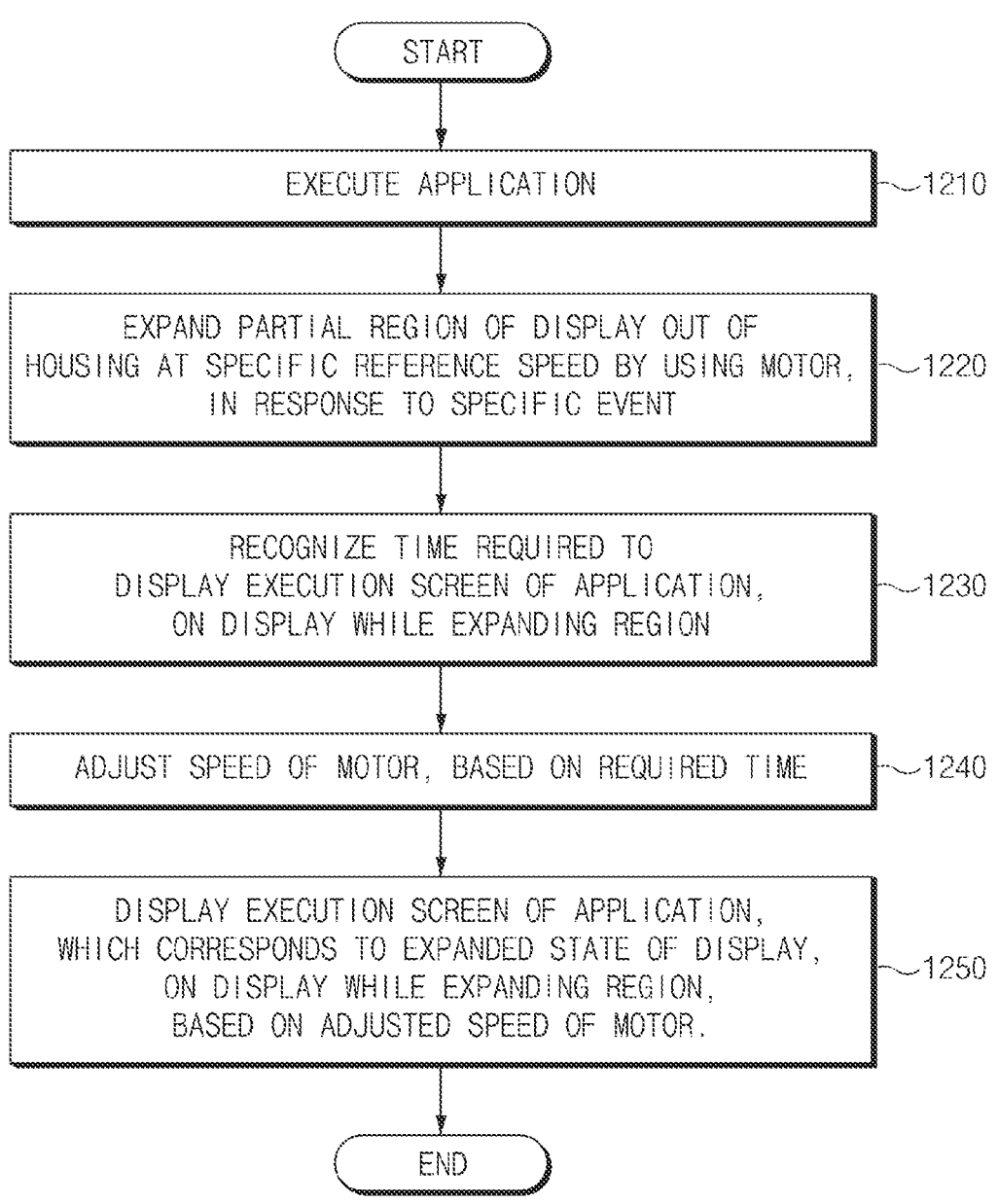

START

EXECUTE APPLICATION ~1210

EXPAND PARTIAL REGION OF DISPLAY OUT OF
HOUSING AT SPECIFIC REFERENCE SPEED BY USING MOTOR,
IN RESPONSE TO SPECIFIC EVENT ~1220

RECOGNIZE TIME REQUIRED TO
DISPLAY EXECUTION SCREEN OF APPLICATION,
ON DISPLAY WHILE EXPANDING REGION ~1230

ADJUST SPEED OF MOTOR, BASED ON REQUIRED TIME ~1240

DISPLAY EXECUTION SCREEN OF APPLICATION,
WHICH CORRESPONDS TO EXPANDED STATE OF DISPLAY,
ON DISPLAY WHILE EXPANDING REGION,
BASED ON ADJUSTED SPEED OF MOTOR. ~1250

END

FIG.12

ELECTRONIC DEVICE AND ELECTRONIC DEVICE OPERATION METHOD

CROSS-REFERENCE TO RELATED APPLICATIONS

This application is a continuation of International Application No. PCT/KR2021/017276, filed on Nov. 23, 2021, designating the United States, in the Korean Intellectual Property Receiving Office, and claiming priority to KR 10-2020-0168640 filed on Dec. 4, 2020 and KR 10-2021-0033566 filed on Mar. 15, 2021, the disclosures of which are all hereby incorporated by reference herein in their entireties.

BACKGROUND

Field

Certain example embodiments relate to a technique of an electronic device including a display capable of expanding and/or reducing a region for displaying a screen by using at least a motor.

Description of Related Art

Various types of electronic devices have been developed and distributed. For example, mobile devices, such as a smartphone, a tablet PC, and a wearable device, and having various functions as well as an existing desktop PC, have been extensively spread. In addition, with the development of technology, electronic devices including flexible displays which can expand or reduce screen display regions, have been developed and distributed as well as electronic devices having the fixed type of displays.

When the screen display region of the display is expanded or reduced at a constant speed by using a motor, a frame may be dropped, instead of sufficiently reflecting an execution screen of the application to correspond to the screen display region of the display, which is changed in the shape or the size, or the execution screen corresponding to the screen display region may not be smoothly displayed, depending on the performance of each application.

SUMMARY

Certain example embodiments are to provide an electronic device capable of controlling the speed of a motor based on the performance of an application displayed on a display, when a screen display region of a display is expanded and/or reduced by using a motor, and/or a method for operating the electronic device.

According to an example embodiment, an electronic device may include a housing, a motor, a display including a region movable out of or into the housing by using the motor, a memory, and a processor operatively connected, directly or indirectly, with the motor, the display, and the memory. The memory includes instructions that when executed, may cause the processor to execute an application, move the region of the display out of the housing at a specific reference speed by using at least the motor, in response to a specific event, recognize a time required to display an execution screen of the application on the display while moving the region, adjust a speed of the motor, based on the required time, and display the execution screen of the application, which corresponds to a state of the display, on the display, while moving the region at the adjusted speed of the motor.

According to an example embodiment, an electronic device may include a housing, a motor, a display including a region movable out of or into the housing by using the motor, a memory, and a processor operatively connected, directly or indirectly, with the motor, the display, and the memory. The memory includes instructions that when executed, may the processor to execute an application, move the region of the display out of the housing at a specific reference speed by using the motor, in response to a specific event, recognize a time required to display an execution screen of the application on the display while moving the region, adjust a speed of the motor, based on the required time, and display the execution screen of the application, which corresponds to a state of the display, on the display, while moving the region at the adjusted speed of the motor.

According to certain example embodiments, the speed of the motor used to expand or reduce the screen display region of the display may be controlled based on the performance of the application displayed on the display.

According to certain example embodiments, the speed of the motor used to expand or reduce the screen display region of the display may be controlled, thereby seamlessly displaying the execution screen of the application on the display while the screen display region is being changed.

According to certain example embodiments, the speed of the motor used to expand or reduce the screen display region of the display may be controlled, thereby reducing a frame drop caused while the screen display region is being changed.

Besides, a variety of effects directly or indirectly understood through the disclosure may be provided.

BRIEF DESCRIPTION OF DRAWINGS

The above and other aspects, features, and advantages of certain example embodiments will be more apparent from the following detailed description, taken in conjunction with the accompanying drawings, in which:

FIG. 7 is a view illustrating an operation of an electronic device, according to an example embodiment;

FIG. 12 is a flowchart illustrating a method of operating an electronic device, according to an example embodiment;

With regard to description of drawings, the same or similar components will be marked by the same or similar reference signs.

DETAILED DESCRIPTION

Figure 1:
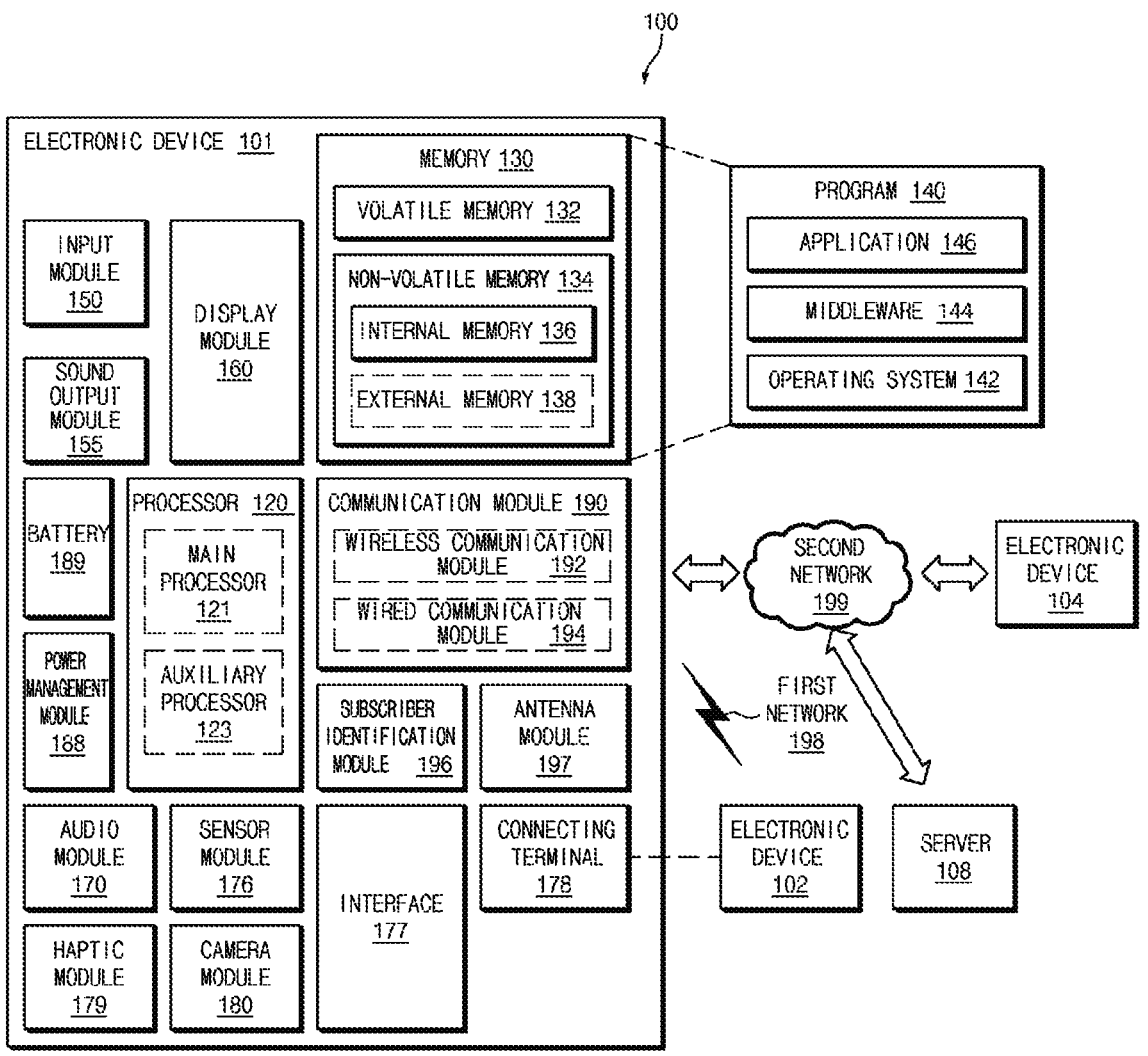
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
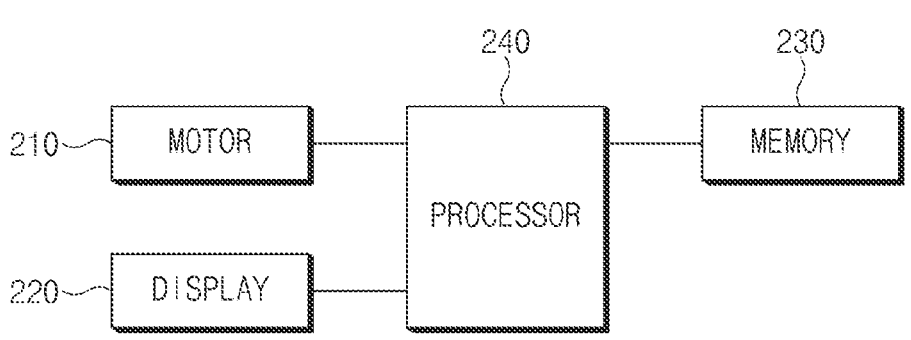
FIG. 2 is a block diagram illustrating an electronic device, according to an example embodiment.

FIG. 2 is a block diagram of an electronic device, according to an embodiment.

According to an embodiment, an electronic device 200 (e.g., the electronic device 101 of FIG. 1) may include a motor 210, a display 220 (e.g., the display module 160 of FIG. 1), a memory 230 (e.g., the memory 130 of FIG. 1), and/or a processor 240 (e.g., the processor 120 of FIG. 1).

According to an embodiment, the motor 210 may move a partial region of the display 220 out of the housing of the electronic device 200 or into the housing. For example, the motor 210 may change the size of a region (e.g., a screen display region) illustrated outside the display 220 (e.g., a sliding display 220 or a rollable display 220).

According to an embodiment, the display 220 may include the flexible display 220 (e.g., the sliding display 220 or the rollable display 220). For example, the display 220 may include a region which is movable out of the housing of the electronic device 200 or into the housing. For example, a partial region of the display 220 may be inserted into the housing to be covered by the housing. For example, the size or shape of the screen display region of the display 220 may be changed, as the partial region of the display 220 is moved out of the housing or into the housing. For example, when the partial region of the display 220 is moved out of the housing, the screen display region may be expanded. When the partial region of the display 220 is moved into the housing, the screen display region may be reduced. According to an embodiment, the speed for moving the partial region of the display 220 out of or into the housing may be varied depending on the speed of the motor 210.

According to an embodiment, the memory 230 may store instructions for controlling the operation of the electronic device 200, when executed by the processor 240. According to an embodiment, the memory 230 may include at least one application (e.g., the application 146 of FIG. 1 and/or FIG. 2).

According to an embodiment, the processor 240 may control the overall operation of the electronic device 200. According to an embodiment, the processor 240 may include a main processor (not illustrated; the main processor 121 of FIG. 1) which controls the main operation of the electronic device 200 and an auxiliary processor (not illustrated; a GPU; e.g., the auxiliary processor 123 of FIG. 1) to perform a graphic processing operation.

According to an embodiment, the processor 240 may execute an application (e.g., the application 146 of FIG. 1) and may display an execution screen of the application on the display 220.

According to an embodiment, the processor 240 may move a partial region of the display 220 out of the housing at a specific reference speed by using the motor 210 or may move the partial region of the display 220 into the housing at the specific reference speed, in response to a specified event. For example, the processor 240 may expand or reduce a region viewed at the outside of the display 220 by using the motor 210. According to an embodiment, the specific event may include a user input or the state of the electronic device 200 for changing the shape (e.g., the form factor) of the display 220 of the electronic device 200. According to an embodiment, the processor 240 may sense the shape of the display 220 changed using a sensor (not illustrated), or may sense the driving speed of the motor 210 to move the partial region of the display 220 out of or into the housing.

According to an embodiment, the processor 240 may recognize the time required to display the execution screen of the application on the display 220 during movement of the display 220 (e.g., the screen display region of the display 220). According to an embodiment, a time required to display the execution screen of the application may include at least one of a time required to determine the size of views included in the execution screen of the application, a time required to determine the layout of the views, and a time required to draw the execution screen into a frame buffer for the application, based on the determined view and the layout. For example, the view may refer to an object for forming an execution screen of an application.

According to an embodiment, the processor 240 may store, in the memory 230, information on a time required to display the execution screen of the application.

According to an embodiment, the processor 240 may recognize a time required to display the execution screen for each activity of the application, and may store, in the memory 230, information on the time required to display the execution screen for each activity. For example, the activity may be unit of the execution screen included in the application. For example, the application may include a plurality of execution screens (e.g., activities). According to an embodiment, the time required to display the execution screen for each activity may include a time required when an execution screen corresponding to the activity is first drawn, a time required to change at least a portion of the execution screen corresponding to the latest activity, and an average value of times accumulated, which are required to change at least a portion of the execution screen corresponding to the activity.

According to an embodiment, the processor 240 may adjust the size of the frame buffer for the application, based on the size of the region, which is viewed outside, of the display 220. According to an embodiment, the frame buffer may be included in the memory 230 or may be formed as a separate storage space. For example, the frame buffer may be a storage space to store the execution screen of the application. According to an embodiment, the change in the shape of the display may change the time required to generate or store the execution screen of the application and/or the size of the frame buffer. For example, the time required to display the execution screen of the application may be varied depending on the configuration (e.g., the complexity), the transparency, and a visual effect application of the execution screen. For example, as the region, which is viewed outside, of the display 220 (e.g., the screen display region of the display 220) is expanded, the size of the frame buffer for the application may be increased. As the region, which is viewed outside, of the display 220 is reduced, the size of the frame buffer for the application may be reduced.

According to an embodiment, the processor 240 may adjust the speed of the motor 210, based on the time required to display the execution screen of the application. According to an embodiment, the processor 240 may adjust the speed of the motor 210, based on the time required to display the execution screen corresponding to the activity, which is currently executed, of activities included in the application.

According to an embodiment, the processor 240 may adjust the speed of the motor 210 in the range of the specific maximum or high motor speed and the specific minimum or low motor speed. For example, even if the execution screen of the application is displayed within a shorter period of time, when the motor 210 excessively speeds up, the electronic device 200 may be broken, or an unintentional impact may be applied to a physical body of a user. To the contrary, even if the execution screen of the application is displayed within a longer period of time, when the motor 210 excessively slows up, the time required to change the shape of the display 220 is prolonged, such that a user feels inconvenient. According to an embodiment, the processor 240 may adjust the speed of the motor 210 within a specific range.

For example, the processor 240 may adjust the driving speed of the motor 210, based on the performance (e.g., the time required to draw) of the application, thereby adjusting the number of execution screens (frames) to be drawn while expanding or reducing the region (e.g., the screen display region), which is viewed outside, of the display 220. For example, the processor 240 may adjust the driving speed of the motor 210, based on the performance (e.g., the time required to draw) of the application, thereby controlling the speed for changing the size of the screen display region of the display 220 to corresponding to the time required to draw the execution screen. For example, on the assumption that the performance (e.g., the time required to draw) of the application is 48 msec, and the total time required to change the reduced region (e.g., the screen display region), which is viewed outside, of the display 220 to an expanded region, which is viewed outside, of the display 220 is 1000 msec, the processor 240 may draw the execution screen of the application by frames (1000 msec/48 msec) during the driving time (e.g., during the time to move the display). For example, the driving time of the motor 210 may refer to a time required to change the region (e.g., the screen display region), which is viewed outside, of the display 220 from the maximum reduced state to the maximum expanded state (or from the maximum expanded state to the maximum reduced state) at the driving speed of the motor 210. For example, when the driving speed of the motor 210 is adjusted to 3,000 msec, the processor 240 may draw the execution screen of the application by 62 frames (3000 msec/48 msec) for the driving time (e.g., the time to move the display 220) of the motor 210. For example, when the processor 240 increases the driving time of the motor 210 (e.g., decreases the speed of the motor 210), the speed for changing the size of the screen display region of the display is decreased, and the processor 240 may draw the execution screen (e.g., updates the frame) to correspond to the changed size of the screen display region. For example, when the maximum driving time of the specific motor 210 of the application is 1,500 msec, and the minimum driving time is 800 msec, the processor 240 may adjust the driving time of the motor 210 to 1,500 msec which is the maximum driving time. For example, the processor 240 may draw the execution screen of the application by 31 frames (1500 msec/48 msec), for the driving time (e.g., the moving time of the display) of the motor 210. For example, when the driving speed of the motor 210 is adjusted, based on the drawing time of the application, thereby increasing the number of execution screens (frames) to be drawn while expanding or reducing the region (e.g., the screen display region), which is viewed outside, of the display 220. For example, the processor 240 may draw more many execution screens corresponding to the shape (e.g., the size of the region, which is viewed outside, of the display 220, or the screen display region of the display 220) of the display 220, while expanding or reducing the region, which is viewed outside, of the display 220. Accordingly, the processor 240 may more seamlessly and smoothly provide, to the user, execution screens suitable for the display 220, which is being changed, while expanding or reducing the region, which is viewed outside, of the display 220, thereby reducing dropped frames.

According to an embodiment, the processor 240 adds up times required to display execution screens of a plurality of applications and may adjust the speed of the motor 210 based on the added-up time, while executing the plurality of applications through the multi-window. For example, simultaneously displaying the execution screens of the plurality of applications requires a time obtained by adding up times to display (draw) the execution screens of the applications. For example, the processor 240 may require a first time required to draw the execution screen of a first application, and a second time required to draw an execution screen of a second application. For example, when the execution screen of the first application and the execution screen of the second application are simultaneously displayed in the form of the multi-window, the time obtained by adding up the first time and the second time are required to draw the whole screens (e.g., the execution screen of the first application and the execution screen of the second application). For example, in this case, the processor 240 may adjust the speed of the motor 210 based on the time obtained by adding up the first time and the second time.

According to an embodiment, the processor 240 may control the speed of the motor 210 based on the stored performance information of the application. According to an embodiment, the performance information may include information on the time required to draw the execution screen supported by the application. For example, the information on the drawing time may include the maximum drawing time, the minimum drawing time, and an average drawing time. For example, the performance information may be contained, as metadata of the application, in the application by a developer (or a distributor) of the application. For example, when the application is distributed, the metadata including the performance information may be contained in the application.

According to an embodiment, the processor 240 may adjust the speed of the motor 210, based on at least one of the performance of the processor 240, the communication state of the electronic device 200, and an available capacity of the memory 230 of the electronic device 200. For example, the time required to display (e.g., draw) the execution screen of the application may be varied depending on a current state (e.g., the speed of the processor 240, the available resources of the processor 240, the communication state of the electronic device 200, and/or the memory capacity of the electronic device 200) of the electronic device 200. According to an embodiment, the processor 240 may adjust the speed of the motor 210 depending on the state of the electronic device 200.

According to an embodiment, the processor 240 may display an execution screen of an application corresponding to the extended state of the display 220, on the display 220, while expanding the screen display region of the display 220 based on the adjusted speed of the motor 210. For example, when the screen display region of the display 220 is expanded or reduced, the processor 240 may create a new execution screen of the application to correspond to the changed shape of the display 220 and may display the new execution screen on the display 220. For example, while the display 220 is expanded, the processor 240 may display an execution screen of the application on the display 220, in the form corresponding to the shape (e.g., size) of the expanded display 220. According to an embodiment, the processor 240 may adjust the speed of the motor 210 to correspond to the time required to display all the execution screens of the application, thereby reducing frames dropped caused while expanding the display 220 and seamlessly changing the execution screen of the application to correspond to the display 220 expanded.

Figure 3:
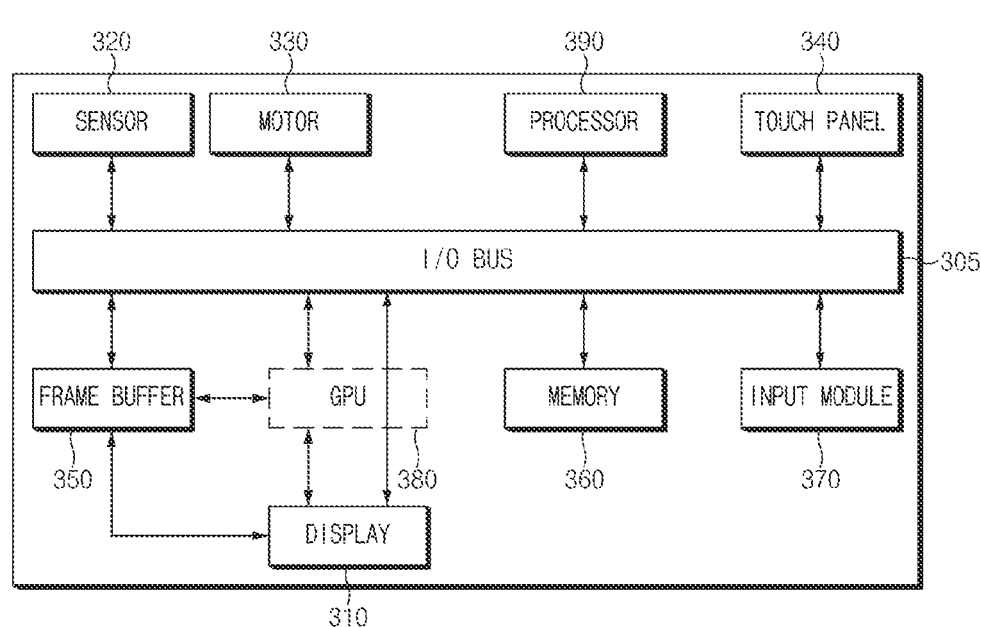
FIG. 3 is a block diagram of an electronic device, according to an example embodiment.

FIG. 3 is a block diagram of an electronic device according to an embodiment. Hereinafter, the duplication of the description made with reference to FIG. 2 will be omitted described in brief.

According to an embodiment, an electronic device 300 (e.g., the electronic device 101 in FIG. 1 or the electronic device 200 in FIG. 2) may include an I/O bus 305, a display 310 (e.g., the display module 160 in FIG. 1 or the display 220 in FIG. 2), a sensor 320 (e.g., the sensor module 176 in FIG. 1), a motor 330 (e.g., the motor 210 of FIG. 2), a touch panel 340 (e.g., the input module 150 of FIG. 1), a frame buffer 350 (e.g., the memory 130 of FIG. 1 or the memory 230 of FIG. 2), a memory 360 (e.g., the memory 130 of FIG. 1 or the memory 230 of FIG. 2), an input module 370 (e.g., the input module 150 of FIG. 1, comprising circuitry), a GPU 380 (e.g., the auxiliary processor 123 of FIG. 1 or the processor 240 of FIG. 2) and/or a processor 390 (e.g., the main processor 121 of FIG. 1 or the processor 240 of FIG. 2).

According to an embodiment, the I/O bus 305 may be an electrical path allowing the communication of each of components (e.g., the display 310, the sensor 320, the motor 330, the touch panel 340, the frame buffer 350, the memory 360, the input module 370 comprising circuitry, the GPU 380, and/or the processor 390) of the electronic device 300. For example, the I/O bus 305 may transmit and receive data (signal) between components of the electronic device 300.

According to an embodiment, the display 310 may display an execution screen of an application (e.g., the application 146 of FIG. 1). For example, the display 310 may output an execution screen stored in the frame buffer 350. For example, the display 310 may output an execution screen of the application based on color values of pixels stored in the frame buffer 350. According to an embodiment, the display 310 may include a flexible display 310 (e.g., the slidable display 310 or the rollable display 310). For example, the region, which is viewed outside, of the display 310, may be expanded out of the housing of the electronic device 300, or may be reduced inside the housing. For example, a partial region of the display 310 may be inserted into the housing to be covered by the housing. For example, the size or shape of the screen display region of the display 310 may be changed, as the partial region of the display 310 is moved out of the housing or into the housing. For example, when the partial region of the display 310 is moved out of the housing, the screen display region may be expanded. When the partial region of the display 310 is moved into the housing, the screen display region may be reduced. According to an embodiment, the speed for moving the partial region of the display 310 out of or into the housing may be varied depending on the speed of the motor 330.

According to an embodiment, the sensor 320 may sense that a region viewed outside the display 310 of the electronic device 300 is expanded or reduced. According to an embodiment, the sensor 320 may sense a driving speed of the motor 330.

According to an embodiment, the motor 330 may move the partial region of the display 310 out of the housing of the electronic device 300 or into the housing.

According to an embodiment, the touch panel 340 may detect a touch input of a user. For example, the touch panel 340 may include a touch screen panel. For example, the touch panel 340 may form a touch screen together with the display 310.

According to an embodiment, the frame buffer 350 may be included in the memory 360 or 230 or may be formed as a separate storage space. For example, the frame buffer 350 may store an execution screen of the application which is drawn. For example, the frame buffer 350 may store color values of pixels included in the execution screen. According to an embodiment, the frame buffer 350 may be included in the GPU 380 or the memory 360. For example, some storage spaces of the memory 360 may be used as the frame buffer 350.

According to an embodiment, the memory 360 may store instructions for controlling the operation of the electronic device 300, when executed by the processor 390. According to an embodiment, the memory 360 may include at least one application (e.g., the application 146 of FIG. 1 and/or FIG. 2).

According to an embodiment, the input module 370 (e.g., the input module 370 and 150 of FIG. 1) may receive a command or data to be used in the component (e.g., the processor 390) of the electronic device 300 from the outside (e.g., a user) of the electronic device 300.

According to an embodiment, the graphic processing unit (GPU) 380 may control an operation of drawing an execution screen of an application and storing the execution screen in the frame buffer 350. According to an embodiment, the GPU 380 may recognize the time required when drawing or updating the execution screen, and provide information on the time required to the processor 390. According to an embodiment, the GPU 380 may draw an execution screen of an application corresponding to the expanded state or the reduced state of the display 310. For example, the GPU 380 may draw the execution screen corresponding to the state (shape) of the display 310 and store the execution screen in the frame buffer 350 based on the information on the expanded state or the reduced state of the display 310, which is received from the processor 390. According to an embodiment, the GPU 380 may control the display 310 to display the execution screen stored in the frame buffer 350. According to an embodiment, the GPU 380 may be included in the processor 390. For example, the processor 390 and the GPU 380 may be provided in the form of one chip set. According to an embodiment, the operation of the GPU 380 may be performed by the processor 390.

According to an embodiment, the processor 390 may control the overall operation of the electronic device 300. According to an embodiment, the processor 390 may execute an application and may display an execution screen of the application on the display 310. According to an embodiment, the processor 390 may move a partial region of the display 310 out of the housing at a specific reference speed by using the motor 330 or 210 or may move the partial region of the display 310 into the housing at the specific reference speed, in response to a specified event. For example, the processor 390 may expand or reduce the screen display region of the display 310, by using the motor 330.

According to an embodiment, the processor 390 may recognize a time required to display the execution screen of the application on the display 310, while expanding the display 310 (e.g., the screen display region of the display 310) and may store information on the recognized time in the memory 360. According to an embodiment, the processor 390 may adjust the size of the frame buffer for the application, based on the shape in which the display 310 is expanded or reduced.

According to an embodiment, the processor 390 may adjust the speed of the motor 330, based on the time required to display the execution screen of the application.

According to an embodiment, the processor 390 may display an execution screen of an application corresponding to the state of the display 310, on the display 310, while expanding the screen display region of the display 310 based on the adjusted speed of the motor 330. For example, the processor 390 may control the GPU 380 to draw the execution screen of the application, which corresponds to the state of the display 310, and to display the execution screen of the application on the display 310.

Figure 4:
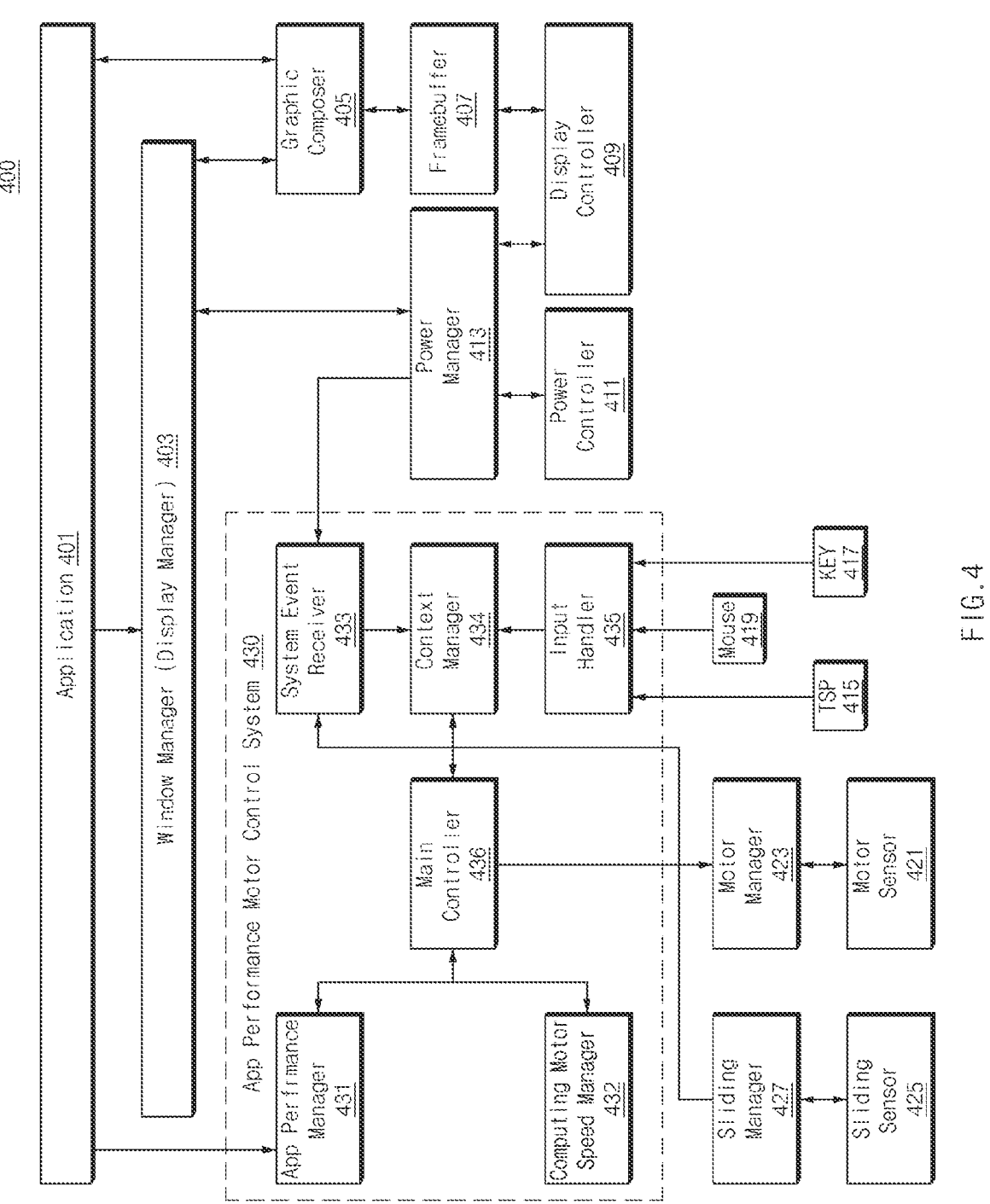
FIG. 4 is a system block diagram of an electronic device, according to an example embodiment.

FIG. 4 is a system block diagram of an electronic device according to an embodiment.

According to an embodiment, the system of an electronic device 400 (e.g., the electronic device 101 in FIG. 1, the electronic device 200 in FIG. 2, or the electronic device 300 in FIG. 3) may include an application 401 (e.g., the application 146 of FIG. 1), a window manager (a display manager) 403, a graphic composer 405, a frame buffer 407 (e.g., the memory 130 of FIG. 1, the memory 230 of FIG. 2, or the frame buffer 350 of FIG. 3), a display controller 409, a power controller 411, a power manager 413, a touch screen panel (TSP) 415, a key 417, a mouse 419, a motor sensor 421, a motor manager 423, a sliding sensor 425, a sliding manager 427, and/or an app performance motor control system 430.

According to an embodiment, the window manager 403 may overall control or manage the screen (e.g., the execution screen of the application 401) displayed on the display (e.g., the display module 160 of FIG. 1, the display 220 of FIG. 2, or the display 310 of FIG. 3).

According to an embodiment, the graphic composer 405 may generate the execution screen by synthesizing the component (e.g., the layer) forming the execution screen. For example, the graphic composer 405 may draw the execution screen and may store the execution screen in the frame buffer 407.

According to an embodiment, the frame buffer 407 may store the drawn execution screen. For example, the frame buffer 407 may store color values of pixels included in the execution screen. According to an embodiment, the size of the frame buffer 407 may be adjusted depending on the shape (e.g., the size or the shape of the region, which is viewed outside) of the display.

According to an embodiment, the display controller 409 may control the display. For example, the display controller 409 may output an execution screen on the display based on color values of pixels stored in the frame buffer 407.

According to an embodiment, the power controller 411 and/or the power manager 413 may manage power supplied to the electronic device 400. For example, the power controller 411 and/or the power manager 413 may supply power to the components of the electronic device 400, and manage the state of use of power used in the components. According to an embodiment, the power controller 411 and/or the power manager 413 may be implemented in the form of one integrated component (e.g., a power management integrated circuit (e.g., the power management module 188 of FIG. 1, comprising circuitry)).

According to an embodiment, the TSP 415 (e.g., the touch panel 340 of FIG. 3), the key 417 and/or the mouse 419 may receive an input for controlling the electronic device 400 from the outside (e.g., a user) of the electronic device 400. According to an embodiment, the TSP 415, the key 417, and/or the mouse 419 may be implemented in the form of one input module (e.g., the input module 150 of FIG. 1 or the input module 370 of FIG. 3).

According to an embodiment, the motor sensor 421 may sense an operation of a motor (e.g., the motor 210 of FIG. 2 or the motor 330 of FIG. 3) to expand a portion of the display out of the housing or reduce the portion of the display by inserting the portion of the display into the housing. For example, the motor sensor 421 may sense an activation state of the motor and/or a driving speed of the motor.

According to an embodiment, the motor manager 423 may control an operation of the motor. For example, the motor manager 423 may activate or deactivate the motor, or adjust the driving speed of the motor under the control of a main controller 436.

According to an embodiment, the sliding sensor 425 may sense whether the display is expanded or reduced. For example, the sliding sensor 425 may sense the sliding of the display. For example, the sliding sensor 425 may detect that the shape (e.g., a form factor) of the display is changed.

According to an embodiment, the sliding manager 427 may control expansion or reduction of the region, which is viewed outside, of the display. For example, the sliding manager 427 may change the shape (e.g., a form factor) of the display, in response to a specific event.

According to an embodiment, the app performance motor control system 430 may control the motor, based on the performance (e.g., the drawing time) of the application 401. According to an embodiment, the app performance motor control system 430 may include an app performance manager 431, a computing motor speed manager 432, the main controller (e.g., the processor 120 of FIG. 1, the processor 130 of FIG. 2, or the processor 390 of FIG. 3) 436, a system event receiver 433, a context manager 434, and/or an input handler 435. Each processor herein comprises processing circuitry.

According to an embodiment, the app performance manager 431 may recognize and store the performance of the application 401. For example, the app performance manager 431 may recognize the time required to display the execution screen of the application 401. According to an embodiment, a time required to display the execution screen of the application 401 may include at least one of a time required to determine the size of views included in the execution screen of the application 401, a time required to determine the layout of the views, and a time required to draw the execution screen into a frame buffer 407 for the application 401, based on the determined view and the layout. According to an embodiment, the app performance manager may recognize a time required to display the execution screen for each activity of the application 401, and may store information on the time required to display the execution screen for each activity. According to an embodiment, the time required to display the execution screen for each activity may include a time required when an execution screen corresponding to the activity is first drawn, a time required to change at least a portion of the execution screen corresponding to the latest activity, and an average value of times accumulated, which are required to change at least a portion of the execution screen corresponding to the activity.

According to an embodiment, the motor speed manager 432 may calculate the driving speed of the motor based on the performance of the application 401 (e.g., the time required to draw the execution screen of the application 401). For example, the motor speed calculation manager 432 may determine the driving speed of the motor to correspond to the time required to display the execution screen of the application 401 on the display based on the performance of the application 401. According to an embodiment, the motor speed calculation manager 432 may determine the speed (motor driving time) of the motor within a range between a specified maximum motor speed (minimum motor driving time) and a minimum motor speed (maximum motor driving time).

According to an embodiment, the system event receiver 433 may detect an event occurring in the electronic device 400. For example, the event may include a specific event for expanding or reducing the display.

According to an embodiment, the context manager 434 may determine the context of an event sensed by the system event receiver 433 or an input sensed by the input handler 435 and transmit information, which corresponds to the event or input, to the main controller 436 based on the determined context.

According to an embodiment, the input handler 435 may detect an input received through the TSP 415, the key 417, and/or the mouse 419.

According to an embodiment, the main processor (e.g., the main processor 121 of FIG. 1 and the processor 240 of FIG. 2) may control the overall operation of the electronic device 400. For example, the main processor may control the operation of each of components included in the system of the electronic device 400 and transmit data (information) between components. For example, the main processor may control the electronic device 400 to perform an operation corresponding to the event or the received input, based on the information received from the context manager 434. For example, the main processor may transmit a control signal for controlling the operation of each component included in the system of the electronic device 400, to the each component. For example, the main processor may transmit performance information of the application 401 recognized and stored by the app performance manager 431 and information on the motor driving speed calculated by the motor speed calculation manager 432 to the sliding manager 427 and/or motor manager 423. For example, the main processor may expand or reduce the region viewed outside the display through the sliding manager 427 and/or the motor manager 423, and may control the speed for expanding or reducing the region, which is viewed outside, of the display.

According to an embodiment, at least one component of the app performance motor control system 430 may be integrated. According to various embodiments, the operation of the app performance motor control system 430, and the operation of the sliding manager 427, and/or the operation of the motor manager 432 may be performed by a processor (e.g., a main controller) of the electronic device.

Figure 5:
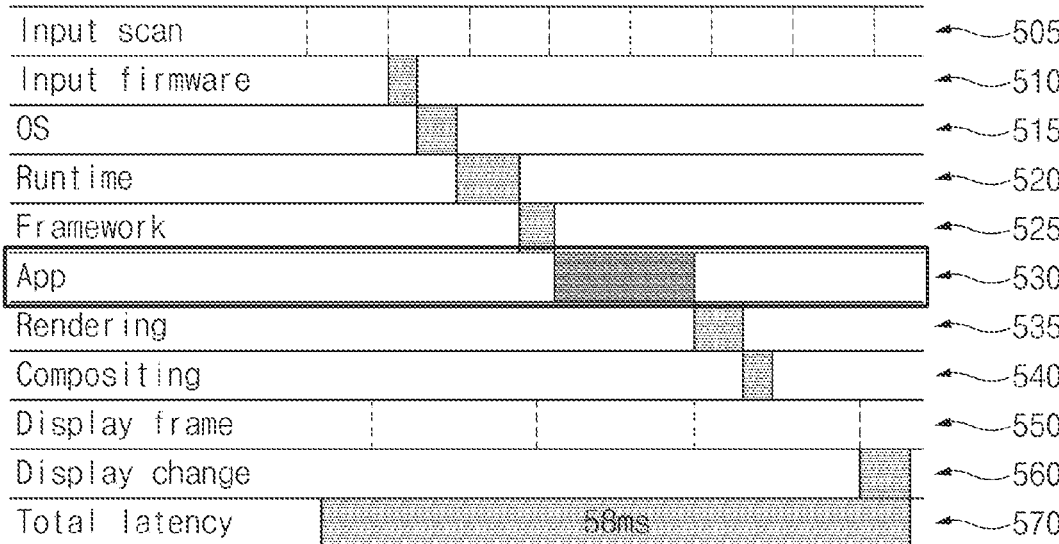
FIG. 5 is a view illustrating a process to display an execution screen of an application, according to an example embodiment.

FIG. 5 is a view illustrating a process for displaying an execution screen of an application according to an embodiment.

According to an embodiment, an electronic device (e.g., the electronic device 101 of FIG. 1, the electronic device 200 of FIG. 2, the electronic device 300 of FIG. 3, or the electronic device 400 of FIG. 4) may perform a plurality of processes to display an execution screen of an application on a display.

For example, the plurality of processes may include a process of scanning an input 505, a process 510 of processing a scanned input by firmware, a process 515 handled by the operating system (OS), a process of processing runtime, a process 525 of processing in the framework, a process 530 in which the application draws the screen, a process 535 of rendering the screen, a 540 process of creating a final execution screen (frame) by synthesizing the rendered screen, a process 550 of outputting the execution screen on the display, or a processor 560 of changing (modifying) at least a portion of the execution screen (in response to a specific event).

According to an embodiment, the process 530 in which the application draws the screen may be a process, which exerts a great influence on the delay time 570 until the final execution screen is displayed, of the plurality of processes. For example, a time usually required for the process 530 in which the application draws the screen may be varied depending on applications, and may be varied depending on activities (e.g., the screen provided in the application) even in the same application.

According to an embodiment, the electronic device may adjust the speed of the motor (e.g., the motor 210 in FIG. 2), based on the time required for the process 530 in which the application draws the screen to display the execution screen corresponding to the screen display region of the display changed, when the partial region of the display is moved out of or into the housing. For example, when the speed of the motor is adjusted based on the time required for the process 530 in which the application draws the screen, the execution screen of the application may be smoothly displayed on the display to correspond to the shape or the size of the screen display region of the display.

Figure 6:
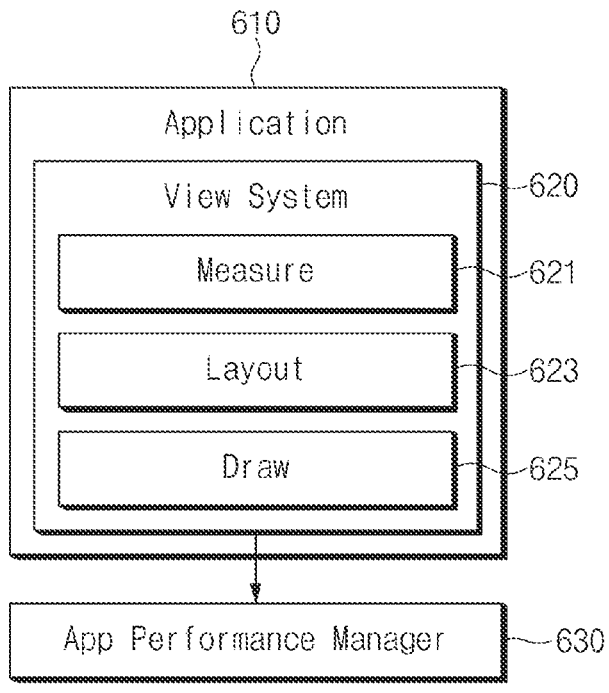
FIG. 6 is a view illustrating a drawing operation of an application, according to an example embodiment.

FIG. 6 is a view illustrating a drawing operation of an application according to an embodiment.

According to an embodiment, an application 610 may draw an execution screen through a view system 620. According to an embodiment, the view system 620 may be a module which entirely manages a view of the application 610. According to an embodiment, the view may include an object forming an execution screen. According to an embodiment, the view system 620 may include a software module which manages a view of an application. For example, the view system 620 may include a software system allowing the application to form and manage the execution screen and may control an input to a touch screen panel (TSP), a key input and/or an output of the execution screen. For example, the view system 620 may transmit a TSP event and/or a key event transmitted from a framework of the electronic device to the views.

According to an embodiment, the view system 620 may include a measure module 621, a layout module 623, and/or a draw module 625. According to an embodiment, the measure module 621 may determine the size of each of the views included in the execution screen. According to an embodiment, the layout module 623 may determine the position of each view in the execution screen, based on the size of the views determined by the measure module 621. According to an embodiment, the draw module 625 may draw an execution screen into the frame buffer related to the application 610, based on the size of views determined by the measure module 621 and the position of views determined by the layout module 623.

According to an embodiment, an app performance manager 630 may store information on the time required when the execution screen of the application 610 is drawn through the view system 620. For example, the app performance manager 630 may store at least one of a time required to initially generate the execution screen, a time required to update (e.g., change a portion of the execution screen in response to the event) of the execution screen, or an average value of accumulated times required to update the execution screen.

According to various embodiments, the operations of the view system 620 and the app performance manager 630 may be performed by the processor (e.g., the processor 120 of FIG. 1, the processor 240 of FIG. 2, the GPU 380 of FIG. 3, the processor 390 of FIG. 3, and/or the main controller 436 of FIG. 4) of the electronic device.

FIG. 7 is a view illustrating an operation of an electronic device according to an embodiment.

According to an embodiment, an electronic device 700 (e.g., the electronic device 101 of FIG. 1, the electronic device 200 of FIG. 2, the electronic device 300 of FIG. 3, or the electronic device 400 of FIG. 4) and a display 710 (e.g., the display module 160 of FIG. 1, the display 220 of FIG. 2, or the display 310 of FIG. 3) including a region which is moved out of or into the housing by using a motor (e.g., the motor 210 of FIG. 2 or the motor 330 of FIG. 3). For example, the display 710 may include the slidable display 710 or the rollable display 710. For example, the partial region of the display 710 may be inserted into the housing to be covered by the housing or may be viewed out of the housing. For example, the shape or the size of the region (the screen display region), which displays the screen, of the display 710 may be changed through the motor. For example, the screen display region of the display 710 may be expanded or reduced by a region 715.

According to an embodiment, the electronic device 700 may display the execution screen of the application to correspond to the shape of the display 710. For example, the electronic device 700 may generate (e.g., draw) and display an execution screen of the application to correspond to the screen display region, which is not expanded as in reference numeral 730, when the screen display region of the display 710 is not expanded, and may generate and display the execution screen of the application to correspond to the screen display region expanded as in reference numeral 735, when the screen display region of the display 710 is expanded. According to an embodiment, the electronic device 700 may change the size of the frame buffer related to the application, in response to the change of the screen display region, when the screen display region is changed. For example, when the screen display region is increased, the electronic device 700 may increase the size of the frame buffer, and may decrease the size of the frame buffer, when the screen display region is decreased. For example, the electronic device 700 may store the execution screen to be drawn into the frame buffer.

Figure 8A:
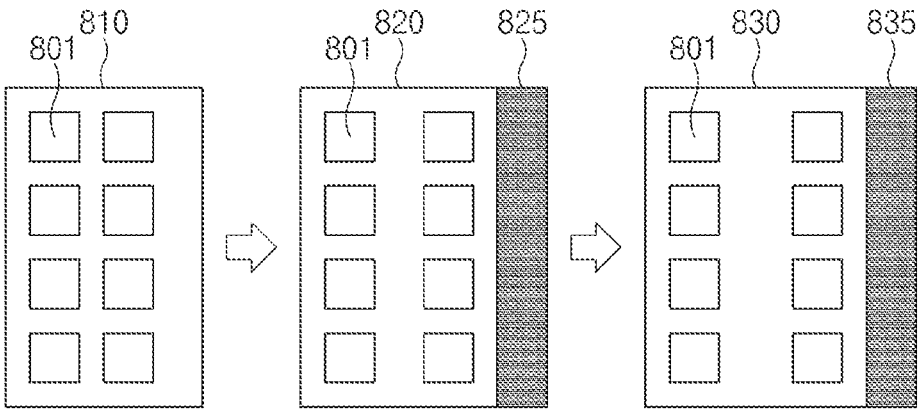
FIGS. 8A and 8B are views illustrating operations of an electronic device, according to an example embodiment.
Figure 8B:
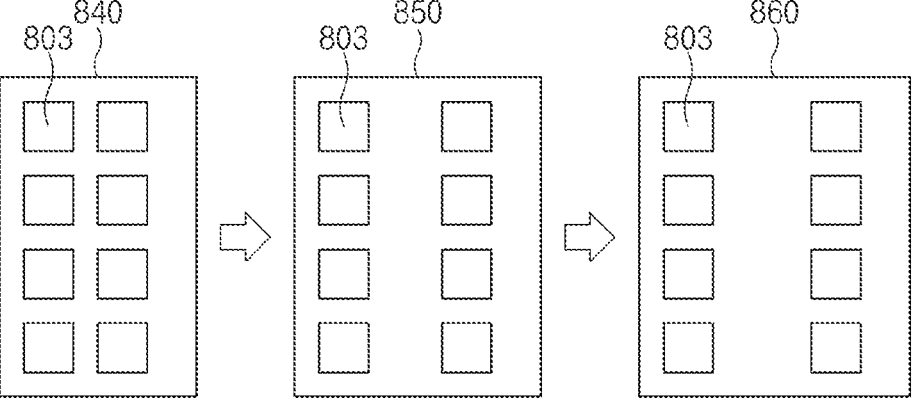

FIGS. 8A and 8B are views illustrating operations of an electronic device according to an embodiment.

According to an embodiment, an electronic device (e.g., the electronic device 101 of FIG. 1, the electronic device 200 of FIG. 2, the electronic device 300 of FIG. 3, or the electronic device 400 of FIG. 4) may include a display including a region movable out of or into the housing by using the motor (e.g., the motor 210 of FIG. 2).

Referring to FIG. 8A, the electronic device may an execution screen 810, 820, or 830 of an application on a display. According to an embodiment, each of the execution screens 810, 820, and 830 may include at least one object 801 forming the execution screen. For example, the at least one object 801 may include an execution icon of an application. For example, the electronic device may use a motor to move a portion of the display out of the housing in a state where the portion of the display is inserted into the housing and hidden by the housing. For example, as the portion of the display is moved out of the housing, the screen display region of the display may be expanded. For example, the electronic device may update the execution screen of the application, as the screen display region of the display is expanded. For example, the electronic device may draw the execution screen of the application to correspond to an expanded screen display region. For example, the electronic device may change the size, shape, and/or arrangement of components (e.g., the at least one object 801 forming an execution screen) of an execution screen to correspond to the size of an expanded screen display region. For example, when the time required to draw the execution screen by the electronic device does not correspond to the speed for expanding the display using the motor, the screen display region of the display may have the regions 825 and 835 in which the execution screen is not displayed. For example, when the speed (e.g., the speed for expanding the display) for moving the display using the motor is higher than the speed for drawing the execution screen of the application, the display may have the regions 825 and 835 in which the execution screen is not displayed on the display.

Referring to FIG. 8B, the electronic device according to an embodiment may adjust the speed of the motor based on the performance of the application (e.g., the time required to draw the execution screen of the application). For example, the electronic device may adjust the speed of the motor to correspond to the time required to draw the execution screen of the application, such that the time required to move the display and the time required to draw the execution screen of the application are equal to each other or approximates each other. For example, when the speed (the speed for expanding the screen display region) for moving the display by using motor corresponds to the time required to draw the execution screen of the application, an execution screen 840, 850, or 860 may be displayed to correspond to the shape of the display moving or finished in moving. According to an embodiment, each of the execution screens 840, 850, and 860 may include at least one object 803 forming the execution screen. For example, the at least one object 803 may include an execution icon of an application. For example, the electronic device may change the size, shape, and/or arrangement of components (e.g., the at least one object 803 forming an execution screen) of the execution screen to correspond to the size of an expanded screen display region. For example, unlike FIG. 8A, regions 825 and 835 in which the execution screen is not displayed may not occur in the screen display region of the display. For example, the electronic device may adjust the speed of the motor for expanding or reducing the screen display region of the display, based on the performance (e.g., the time required to draw the execution screen of the application) of the application, thereby seamlessly updating the execution screen corresponding to the shape of the display during moving of the display, and reducing the frame drop.

Figure 9:
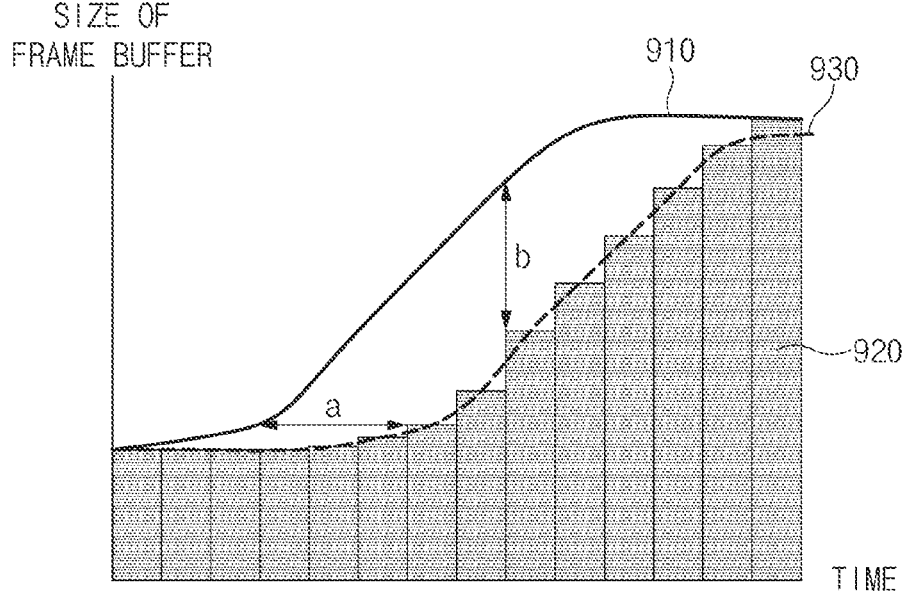
FIG. 9 is a view illustrating the operation of an electronic device, according to an example embodiment.

FIG. 9 is a view illustrating an operation of an electronic device according to an embodiment. For example, FIG. 9 is a graph illustrating the relationship between the speed for expanding the display by the electronic device (e.g., the electronic device 101 of FIG. 1, the electronic device 200 of FIG. 2, the electronic device 300 of FIG. 3, or the electronic device 400 of FIG. 4) and the frame buffer size of the application. For example, curves 910 and 930 indicates the size of the frame buffer corresponding to the size of the display (e.g., the screen display region of the display) changed depending on the speed of the motor over time, and a bar graph 920 indicates the change state (e.g., the drawing state of the execution screen of the application) of the size of the frame buffer over time.

For example, referring to 910, the speed of the motor is not matched with the time required to draw the execution screen of the application. For example, only when the size of the frame buffer as in reference numeral 920 corresponds to the size of the screen region of the display, the execution screen be drawn to correspond to the state of the display (e.g., the form of the display), and the display may not have the region in which the execution screen is not displayed on the display, actually. For example, as in reference numeral 910, the speed for expanding the screen display region of the display as a partial region of the display is moved out of the housing may be greater than the speed for increasing the frame buffer of the application. For example, the size of the frame buffer actually changed may be smaller than the size value of the frame buffer required to draw the execution screen corresponding to the size of the screen display region of the display which is changed. In this case, a response delay time "a" may occur, and the difference "b" between the screen of the display and the execution screen drawn by the application may be made.

According to an embodiment, the electronic device may adjust the speed of the motor extending the display based on the performance of the application (e.g., the time required to draw the execution screen of the application). For example, referring to reference numeral 920, when the time required to resize the frame buffer of the application corresponds to the time required to move the display, unlike reference number 910, the response delay time "a" and/or the difference "b" between the screen display region of the display and the execution screen drawn by the application may be eliminated or reduced. For example, the size value of the frame buffer required to draw the execution screen corresponding to the size of the screen display region of the changed display may correspond to the size of the frame buffer which is actually changed. For example, the screen display region of the display may refer to the region, which is viewed outside, of the display and/or the region of the display for displaying the execution screen.

Figure 10A:
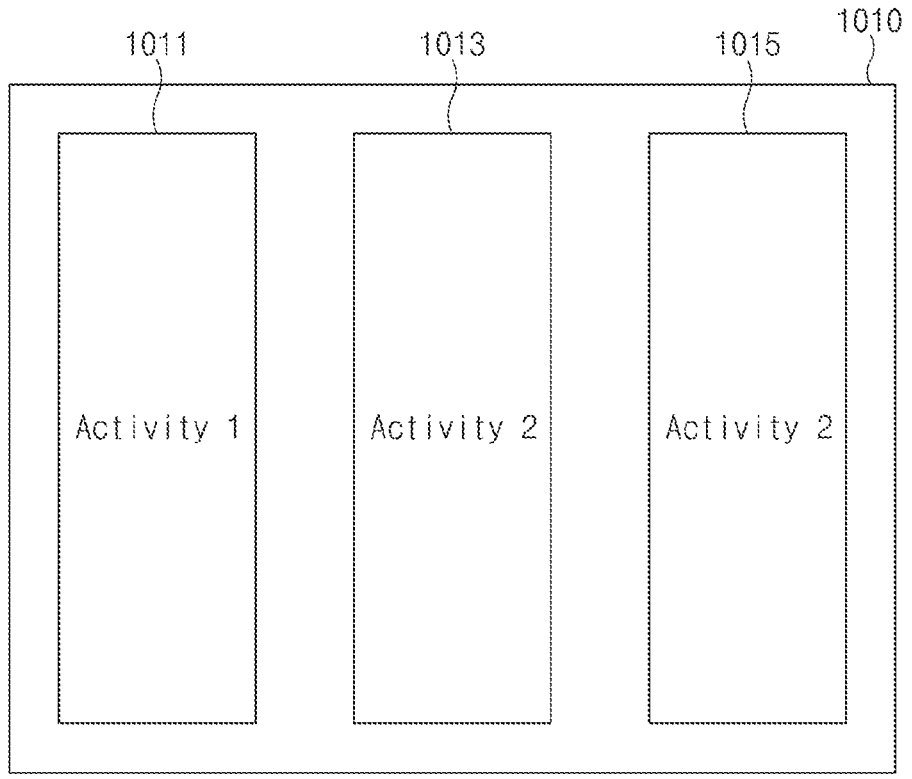
FIGS. 10A and 10B are views illustrating an operation of an electronic device, according to an example embodiment.
Figure 10B:
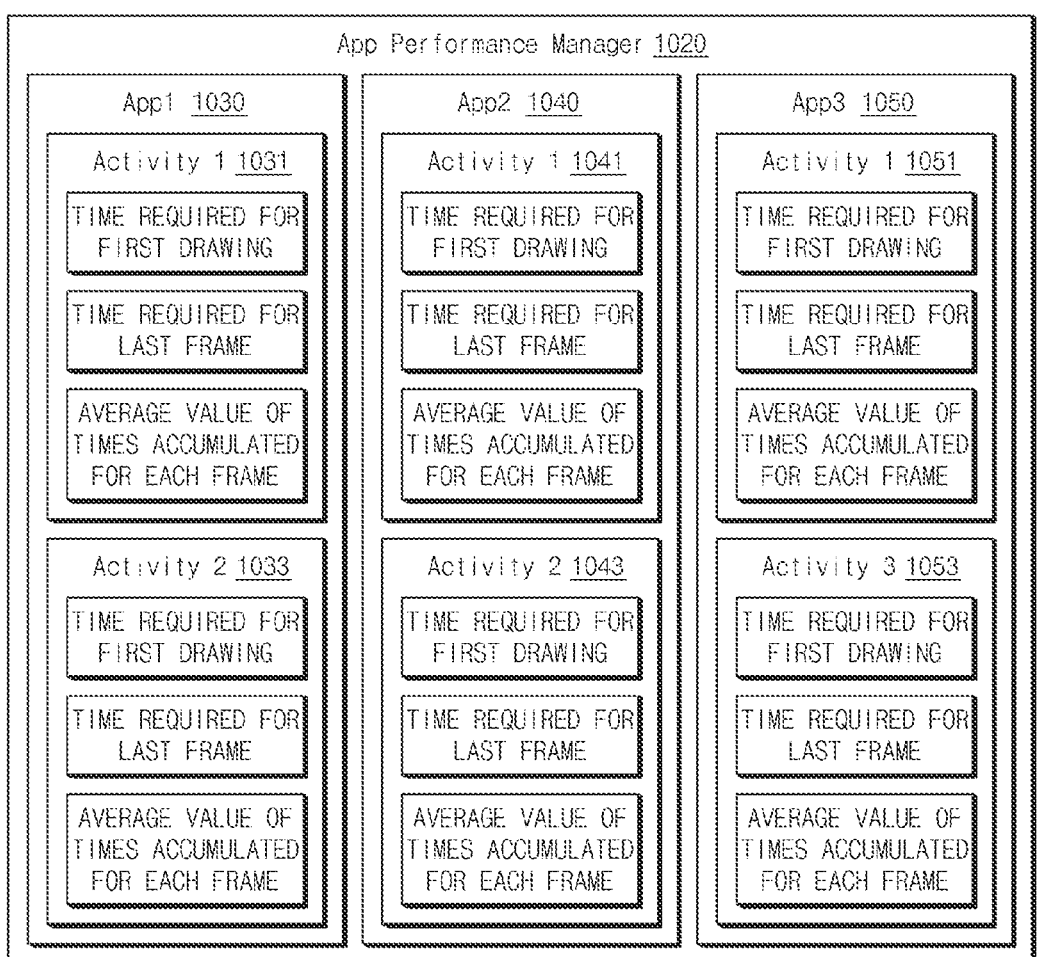

FIGS. 10A and 10B are views illustrating operations of an electronic device according to an embodiment.

Referring to FIG. 10A, according to an embodiment, an electronic device (e.g., the electronic device 101 of FIG. 1, the electronic device 200 of FIG. 2, the electronic device 300 of FIG. 3, or the electronic device 400 of FIG. 4) may include at least one application 1010. According to an embodiment, the application 1010 may include a plurality of activities (e.g., a first activity 1011, a second activity 1013, and/or a third activity 1015). For example, the activity may refer to the unit of the execution screen of the application. For example, the application 1010 may include a plurality of activities (e.g., execution screens; the first activity 1011, the second activity 1013, and/or the third activity 1015). Referring to FIG. 10A, although it is illustrated that the application 1010 includes the first activity 1011, the second activity 1013, and the third activity 1015, this is provided for the illustrative purpose. For example, the number of activities included in the application is not limited thereto.

Referring to FIG. 10B, according to an embodiment, an electronic device (e.g., an app performance manager 1020; the app performance manager 431 of FIG. 4) may store performance information 1030, 1040, or 1050 (e.g., the time required to display the execution screen of the application) of the application 1010. For example, when displaying the execution screen of the application 1010, the app performance manager 1020 may recognize the time required to display the execution screen and store information of the recognized time. According to an embodiment, the app performance manager 1020 may store performance information 1031, 1033, 1041, 1043, 1051, or 1053 for each activity 1011, 1013, and 1015 of the application 1010. For example, referring to FIG. 10B, the performance information 1030 of the first application may include performance information 1031 of the first activity of the first application and/or performance information 1033 of the second activity of the first application. The performance information 1040 of the second application may include performance information 1041 of the first activity of the second application and/or performance information 1043 of the second activity of the second application. The performance information 1050 of the third application may include performance information 1051 of the first activity of the third application and/or performance information 1053 of the second activity of the third application. For example, when displaying the execution screen of the application 1010, the app performance manager 1020 may recognize the time required to display the execution screen for each of the activity 1011, 1013, or 1015 of the application 1010 and may store information of the recognized time. According to an embodiment, the time required to display the execution screen for each activity may include a time required when an execution screen corresponding to the activity is first drawn, a time required to change at least a portion of the execution screen corresponding to the latest activity, and an average value of times accumulated, which are required to change at least a portion of the execution screen corresponding to the activity. According to various embodiments, FIG. 10B illustrates an example, and performance information managed by the electronic device (e.g., the app performance manager 1020) is not limited to the one illustrated in FIG. 10B.

According to an embodiment, the electronic device may adjust the speed of the motor to control the display, based on the performance information (performance information for each activity) of the stored application, when expanding or reducing the region, which is viewed outside, of the display.

According to an example embodiment, the electronic device (e.g., the electronic device 101 of FIG. 1, the electronic device 200 of FIG. 2, the electronic device of FIG. 3, the electronic device 400 of FIG. 4, or the electronic device 1300 of FIGS. 13 to 14) may include a housing, a motor (e.g., the motor 210 of FIG. 2 or the motor 330 of FIG. 3), a display (e.g., the display module 160 of FIG. 1, the display 220 of FIG. 2, or the display 310 of FIG. 3) including a region movable out of or into the housing of the electronic device by using the motor, a memory (e.g., the memory 130 of FIG. 1, the memory 230 of FIG. 2, or the memory 360 of FIG. 3), and a processor (e.g., the processor 120 of FIG. 1, the processor 240 of FIG. 2, the processor 390 of FIG. 3, or the main controller 436 of FIG. 4) operatively connected, directly or indirectly, to the motor, the display, and the memory. The memory may store instructions that when executed cause the processor to execute an application (e.g., the application 146 of FIG. 1 or the application 401 of FIG. 4), to move the region of the display out of the housing at a specific speed by using the motor, in response to the specific event, to recognize the time required to display the execution screen of the application on the display while moving the region, to adjust the speed of the motor based on the required time, and to display the execution screen of the application, which corresponds to the state of the display, on the display, while moving the region at the adjusted speed of the motor.

According to an embodiment, the instructions cause the processor to adjust the size of the frame buffer for the application, based on the state in which the region of the display is moved.

According to an embodiment, the required time may include at least one of a time required to determine the sizes of views included in the execution screen of the application, a time required to determine the layout of the views, and a time required to draw the execution screen into a frame buffer for the application, based on the determined view and the determined layout.

According to an embodiment, the instructions may cause the processor to recognize a time required to display the execution screen for each activity of the application, and may store, in the memory, information on the time required to display the execution screen for each activity.

According to an embodiment, the time required to display the execution screen for each activity may include a time required when an execution screen corresponding to the activity is first drawn, a time required to change at least a portion of the execution screen corresponding to the latest activity, and an average value of times accumulated, which are required to change at least a portion of the execution screen corresponding to the activity.

According to an embodiment, the instructions may cause the processor to adjust the speed of the motor, based on the time required to display the execution screen corresponding to the activity, which is currently executed, of activities included in the application.

According to an embodiment, the instructions may cause the processor to adjust the speed of the motor in a range of a specific maximum motor speed and a specific minimum motor speed.

According to an embodiment, the instructions may cause the processor to add up times required to display execution screens of a plurality of applications and may adjust the speed of the motor based on the added-up time, while executing the plurality of applications through the multi-window.

According to an embodiment, the instructions may cause the processor to control the speed of the motor, based on the performance stored which is previously stored in the application.

According to an embodiment, the instructions may cause the processor to adjust the speed of the motor, based on at least one of the performance of the processor, the communication state of the electronic device, and an available capacity of the memory of the electronic device.

Figure 11:
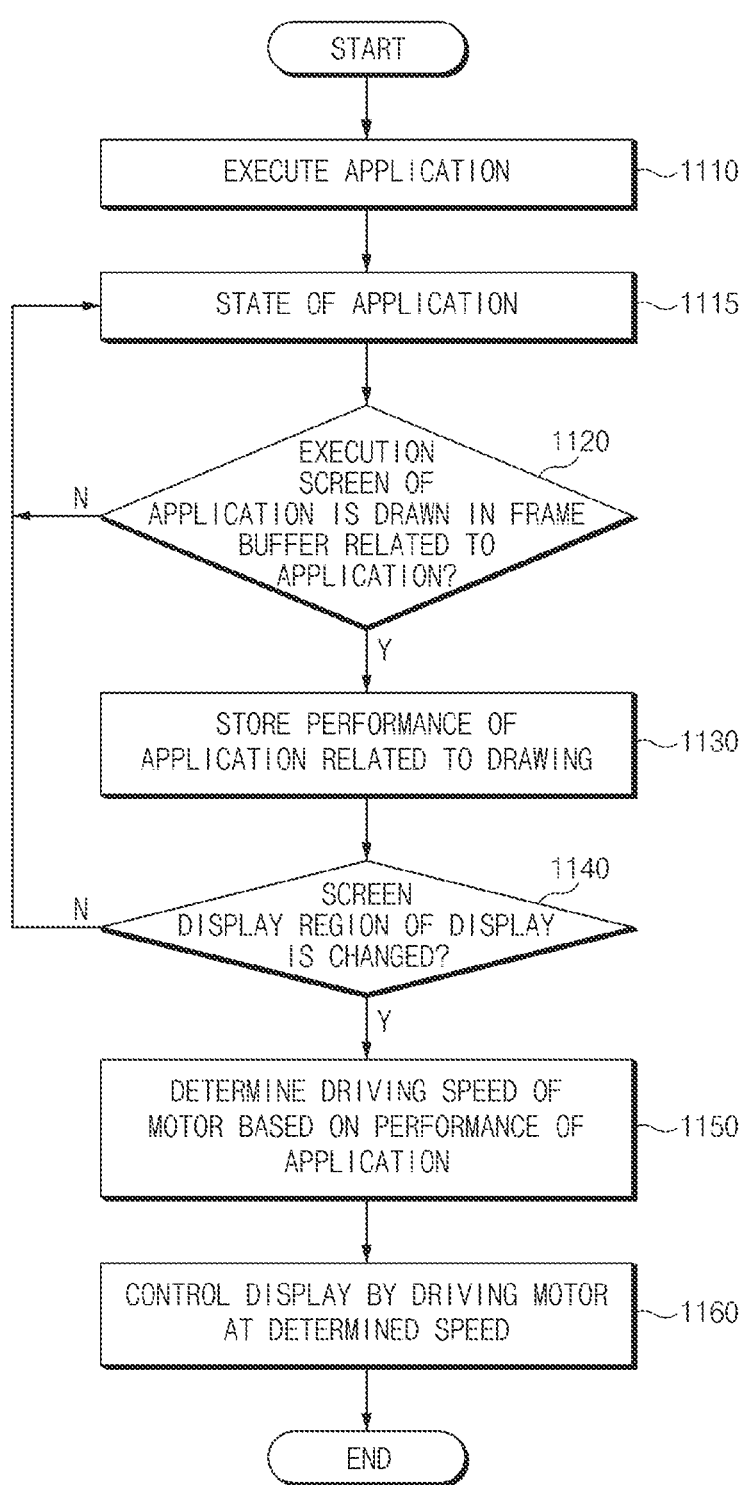
FIG. 11 is a flowchart illustrating a method of operating an electronic device, according to an example embodiment.

FIG. 11 is a flowchart illustrating a method of operating an electronic device according to an embodiment.

According to an embodiment, in operation 1110, an electronic device (e.g., the electronic device 101 of FIG. 1, the electronic device 200 of FIG. 2, the electronic device 300 of FIG. 3, or the electronic device 400 of FIG. 4) may perform an application. According to an embodiment, the electronic device may include the display including the region movable out of or into the housing.

According to an embodiment, in operation 1115, the electronic device may maintain the application to be an idle state. For example, the electronic device may maintain an execution state (e.g., the first execution state of the application or the state of the application previously executed; the execution screen of the application, which is previously displayed) of the application.

According to an embodiment, in operation 1120, the electronic device may determine whether to draw the execution screen of the application into the frame buffer related to the application. For example the electronic device may display the first execution screen of the application by executing the application, or may determine whether to draw the execution screen to change the execution screen of the application which is being executed. According to an embodiment, the electronic device may perform operation 1130 when drawing the execution screen of the application, and may perform operation 1115 when not drawing the execution screen of the application.

According to an embodiment, in operation 1130, the electronic device may draw the execution screen of the application, and may store the performance (e.g., the time required to draw the execution screen) of the application related to the drawing in the memory. According to an embodiment, the electronic device may adjust the speed of the motor in operation 1150 by using the stored performance of the application. According to an embodiment, the electronic device may recognize (measure) the performance (e.g., the drawing speed (the time required for drawing)) of the application, and may update information related to the performance of the application, which is stored in the memory, whenever drawing or updating the execution screen of the application, regardless of whether the screen display region of the display is changed.

According to an embodiment, in operation 1140, the electronic device may determine whether the screen display region (e.g., the size of the screen display region) of the display is changed (e.g., whether a partial of the display is moved out of or into the housing). For example, the electronic device may determine whether the screen display region of the display is changed, by using the sensor. According to an embodiment, the electronic device may recognize the reference speed of the motor by using the sensor. According to an embodiment, the electronic device may perform operation 1150 when the screen display region of the display is being changed, and may perform operation 1115 when the screen display region of the display is not changed (e.g., when the shape of the display is not changed).

According to an embodiment, in operation 1150, the electronic device may determine the driving speed of the motor, based on the performance of the application. For example, the electronic device may adjust (change) the reference speed of the motor to the speed determined based on the performance of the application, when the screen display region of the display is started to be changed. According to an embodiment, the performance of the application may include the drawing performance of the application. For example, the drawing performance may include the time required for the application to draw the execution screen in the frame buffer.

According to an embodiment, in operation 1160, the electronic device may control the display by controlling the motor at the determined speed. For example, the electronic device may change the screen display region of the display at the determined speed. According to an embodiment, the electronic device may display (update) the execution screen of the application on the display moving or finished in moving. For example, the electronic device may display the execution screen generated to correspond to the state of the display moving or finished in moving. According to an embodiment, since the speed of the motor is adjusted based on the performance (drawing performance) of the application, while the shape of the display is changed (e.g., expanded), the execution screen corresponding to the shape of the changed display may be seamlessly displayed, and the frame drop may be reduced.

According to an embodiment, the electronic device may consecutively perform operations 1150 and 1160, while the screen display region of the display is being changed (e.g., the partial region of the display is moving out of or into the housing by using the motor). For example, the electronic device may recognize (measure) the performance (e.g., the drawing speed) of the application while the screen display region of the display is being changed, and may determine the driving speed of the motor based on the recognized performance of the application to control the motor. For example, the electronic device may consecutively control the driving speed of the motor, based on the performance of the application while the screen display region of the display is being changed. Accordingly, the electronic device may actively control the speed of the motor while the screen display region of the display is being changed, and may display the execution screen corresponding to the screen display region which is being changed.

FIG. 12 is a flowchart illustrating a method of operating an electronic device according to an embodiment.

According to an embodiment, in operation 1210, an electronic device (e.g., the electronic device 101 of FIG. 1, the electronic device 200 of FIG. 2, the electronic device 300 of FIG. 3, or the electronic device 400 of FIG. 4) may perform an application. According to an embodiment, the electronic device may include the display including the region movable out of or into the housing by using the motor. For example, the size of the region for displaying the execution screen on the display may be changed, as the partial region of the display is moved out of or into the housing. According to an embodiment, the electronic device may display the execution screen of the application on the display (e.g., the screen display region of the display). According to an embodiment, the electronic device may maintain the application to be in the idle state, until the specific event occurs. For example, the idle state of the application may refer to the state in which the application is being executed (e.g., a first execution state of the application and/or the previously executed state (e.g., the state of maintaining the execution screen of the application previously displayed) of the application).

According to an embodiment, in operation 1220, the electronic device may move the partial region of the display out of the housing at a specific speed by using the motor, in response to the specific event. For example, the processor may expand the screen display region of the display by using the motor. According to an embodiment, the specific event may include a user input to change the shape (e.g., a form-factor) of the display of the electronic device or the state of the electronic device.

According to an embodiment, in operation 1230, the electronic device may recognize the time required to display the execution screen of the application on the display, when the partial region of the display is being expanded.

According to an embodiment, a time required to display the execution screen of the application may include at least one of a time required to determine the size of views included in the execution screen of the application, a time required to determine the layout of the views, and a time required to draw the execution screen into a frame buffer for the application, based on the determined view and the determined view. For example, the view may refer to an object for forming an execution screen of an application.

According to an embodiment, the processor 240 may store, in the memory 230, information on a time required to display the execution screen of the application.

According to an embodiment, the processor 240 may recognize a time required to display the execution screen for each activity of the application, and may store, in the memory 230, information on the time required to display the execution screen for each activity. For example, the activity may be unit of the execution screen included in the application. For example, the application may include a plurality of execution screens (e.g., activities). According to an embodiment, the time required to display the execution screen for each activity may include a time required when an execution screen corresponding to the activity is first drawn, a time required to change at least a portion of the execution screen corresponding to the latest activity, and an average value of times accumulated, which are required to change at least a portion of the execution screen corresponding to the activity.

According to an embodiment, the electronic device may add up times required to display execution screens of a plurality of applications and may recognize the total required time, while executing the plurality of applications through the multi-window.

According to an embodiment, the electronic device may adjust the size of the frame buffer for the application, based on the shape in which the region, which is viewed outside, of the display is expanded or reduced. For example, the frame buffer may be a storage space to store the execution screen of the application. According to an embodiment, the change in the shape of the display may change the time required to generate or store the execution screen of the application and/or the size of the frame buffer. For example, the time required to display the execution screen of the application may be varied depending on the configuration (e.g., the complexity), the transparency, and a visual effect application of the execution screen. For example, the electronic device may increase the size of the frame buffer for the application, as the region (e.g., the screen display region of the display), which is viewed outside, of the display is expanded, and may reduce the size of the frame buffer for the application, as the region, which is viewed outside, of the display is reduced.

According to an embodiment, in operation 1240, the electronic device may adjust the speed of the motor based on the time required to display the execution screen of the application.

According to an embodiment, the electronic device may adjust the speed of the motor, based on the time required to display the execution screen corresponding to the activity, which is currently executed, of activities included in the application. According to an embodiment, the electronic device may adjust the speed of the motor in the range of the specific maximum motor speed and the specific minimum motor speed. According to an embodiment, the electronic device adds up times required to display execution screens of a plurality of applications and may adjust the speed of the motor based on the added-up time, while executing the plurality of applications through the multi-window. For example, simultaneously displaying the execution screens of the plurality of applications requires for a time obtained by adding up displaying (drawing) times of the execution screens of the applications. For example, the processor 240 may require a first time required to draw the execution screen of a first application, and a second time required to draw an execution screen of a second application. For example, when the execution screen of the first application and the execution screen of the second application are simultaneously displayed in the form of the multi-window, the time obtained by adding up the first time and the second time are required to draw the whole screens (e.g., the execution screen of the first application and the execution screen of the second application). For example, in this case, the electronic device may adjust the speed of the motor based on the time obtained by adding up the first time and the second time.

According to an embodiment, the electronic device may control the speed of the motor based on information on performance which is previously stored in the application. According to an embodiment, the performance information may include information on the time required to draw the execution screen supported by the application. For example, the information on the time required to draw the execution screen may include the maximum drawing time, the minimum drawing time, and an average drawing time. For example, the performance information may be contained, as metadata of the application, in the application by a developer (or a distributor) of the application. For example, when the application is distributed, the metadata including the performance information may be contained in the application.

According to an embodiment, the electronic device may adjust the speed of the motor, based on at least one of the performance of the electronic device, the communication state of the electronic device, and an available capacity of the memory of the electronic device. For example, the time required to display (e.g., draw) the execution screen of the application may be varied depending on a current state (e.g., the speed of the electronic device, the available resources of the electronic device, the communication state of the electronic device, and/or the memory capacity of the electronic device), of the electronic device. According to an embodiment, the electronic device may adjust the speed of the motor depending on the state of the electronic device.

According to an embodiment, in operation 1250, the electronic device may display the execution screen of the application corresponding to the expanding state of the display, on the display, while expanding the partial region of the display at the speed of the motor, which is adjusted. For example, when the screen display region of the display is expanded or reduced, the electronic device may create a new execution screen of the application to correspond to the changed shape of the display and may display the new execution screen on the display. For example, the electronic device may display, on the display, the execution screen of the application in the shape corresponding to the shape (e.g., the size) of the display expanded, while the display is being expanded. According to an embodiment, the electronic device may adjust the speed of the motor to correspond to the time required to display the execution screen of the application, thereby reducing frames dropped caused while expanding the display and seamlessly changing the execution screen of the application to correspond to the display expanded.

Although FIG. 12 illustrates the operation when the partial region of the display is moved out of the housing (e.g., when the size of the screen display region of the display is expanded), the disclosure is not limited thereto. When the partial region of the display is moved into the housing (e.g., when the size of the screen display region of the display is reduced), the electronic device may adjust the speed of the motor based on the time required to display the execution screen of the application, and may perform the operation of displaying, on the display, the execution screen of the application, which corresponds to the state in which the display is reduced, while a partial region is reduced at the adjusted motor speed.

Figure 13A:
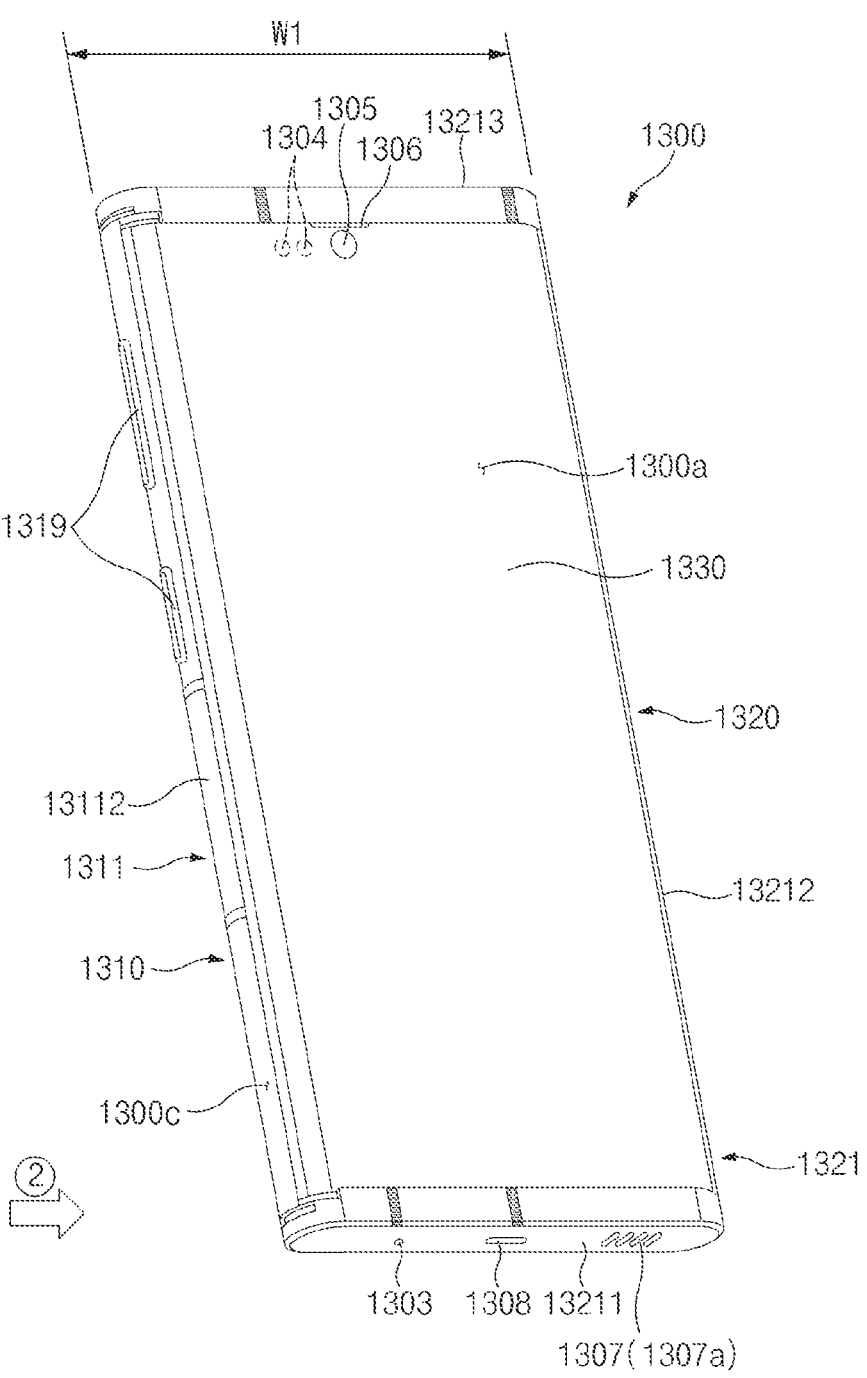
FIGS. 13A and 13B are views illustrating a front surface and a rear surface of an electronic device in a slide-in state, according to certain example embodiments.
Figure 13B:
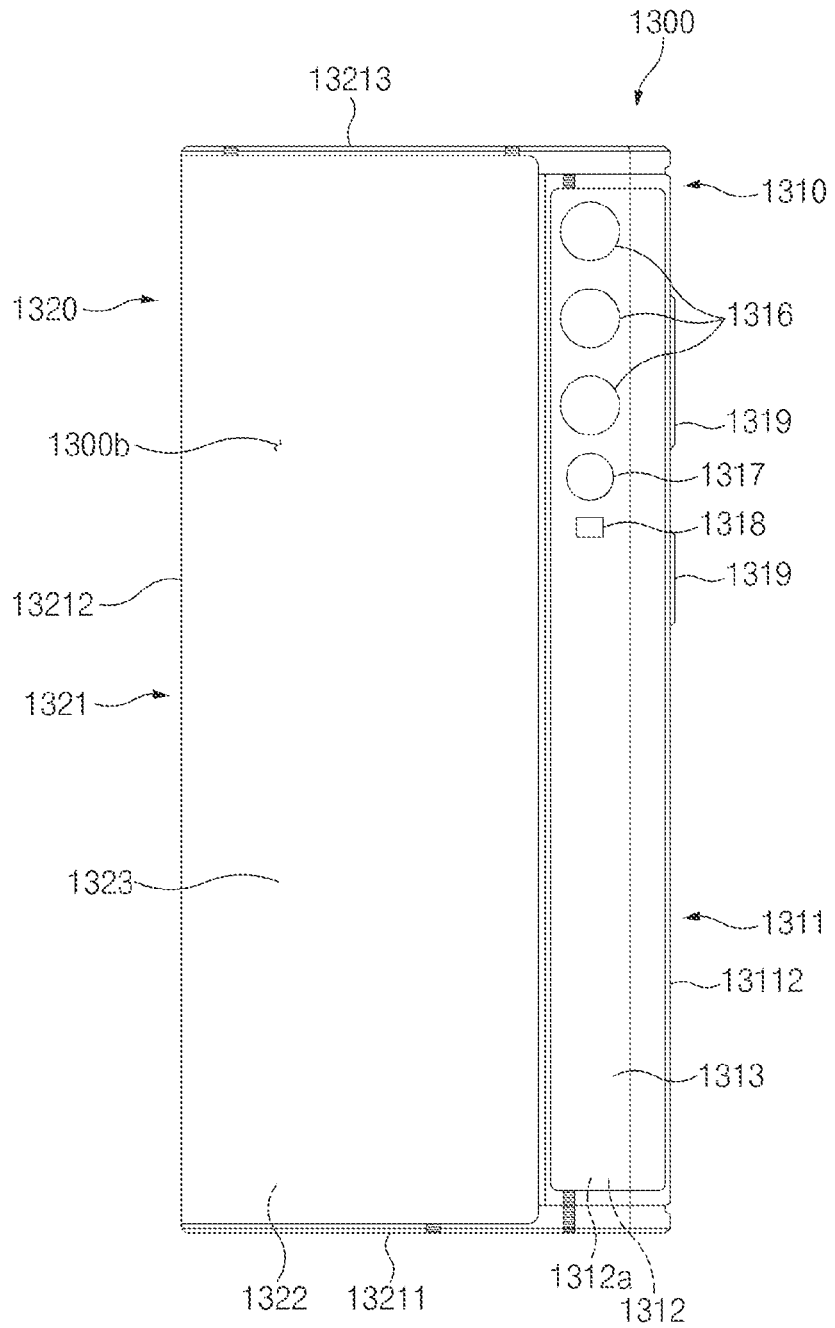
Figure 14A:
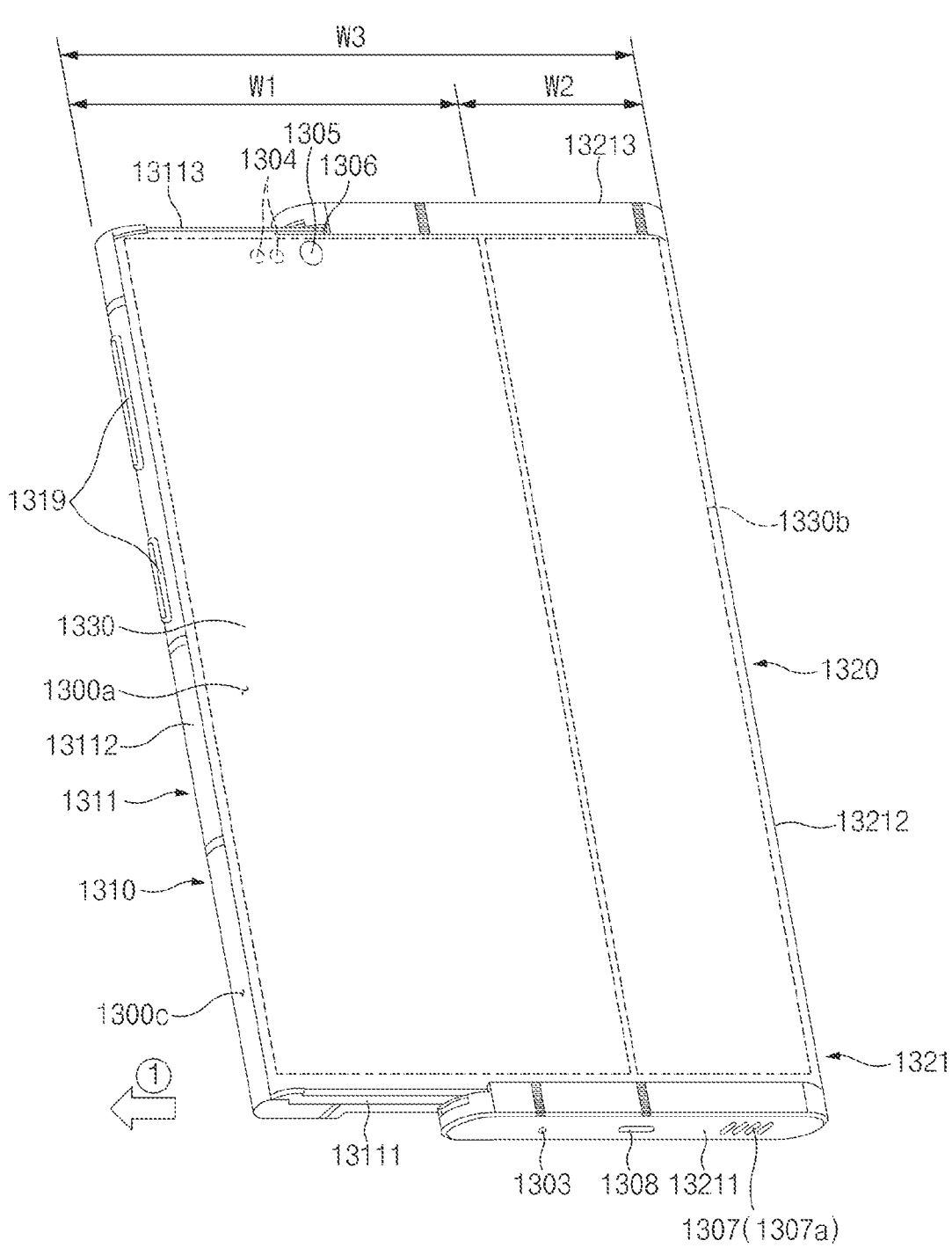
FIGS. 14A and 14B are views illustrating a front surface and a rear surface of an electronic device in a slide-out state, according to certain example embodiments.
Figure 14B:
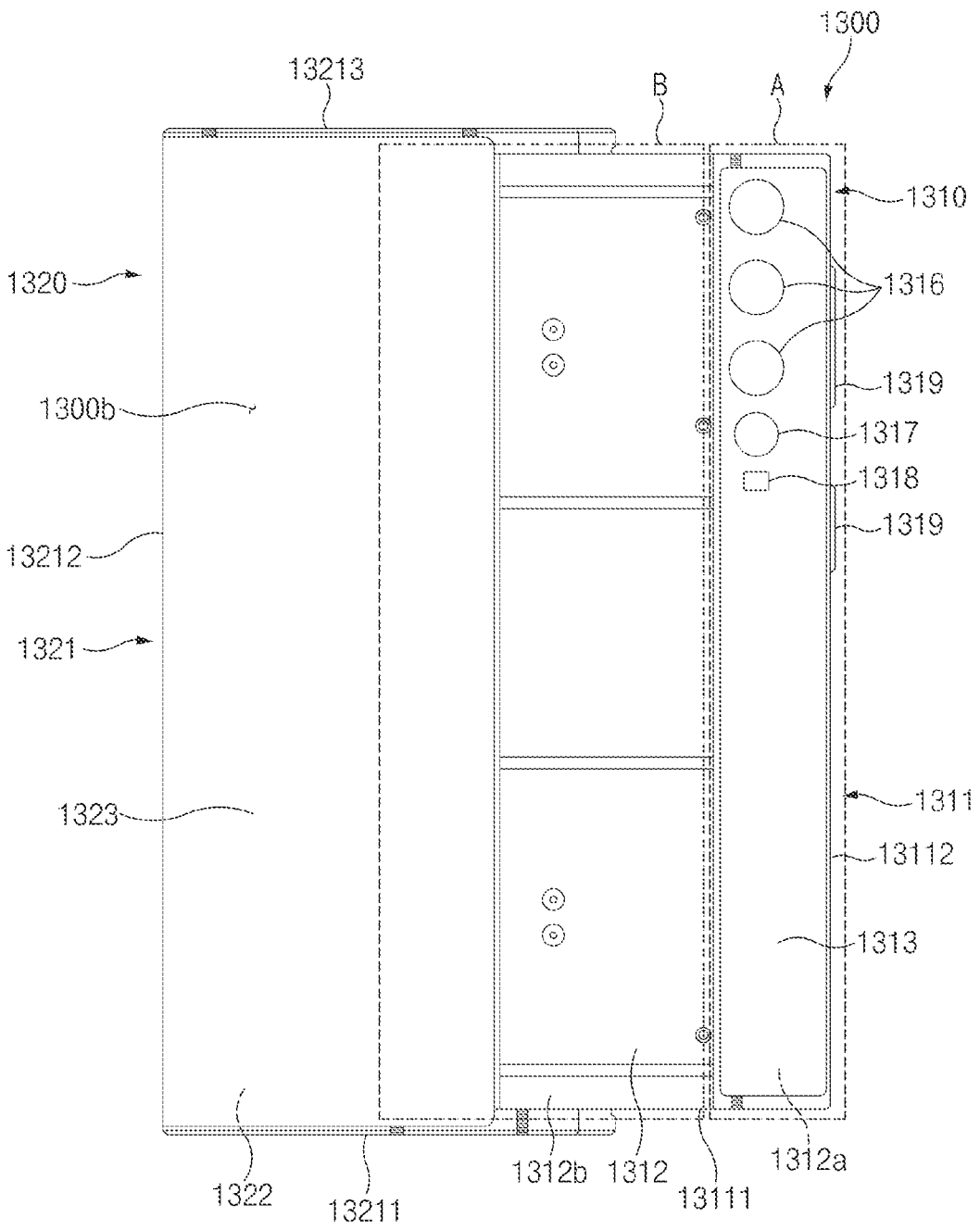

FIGS. 13A and 13B are views illustrating a front surface and a rear surface of an electronic device in a slide-in state, according to certain example embodiments. FIGS. 14A and 14B are views illustrating a front surface and a rear surface of an electronic device in a slide-out state, according to certain example embodiments.

An electronic device 1300 (e.g., the electronic device 101 of FIG. 1, the electronic device 200 of FIG. 2, the electronic device 300 of FIG. 3, or the electronic device 400 of FIG. 4) illustrated in FIGS. 13A to 14B may be at least partially similar to the electronic device 101 of FIG. 1 and may further include other embodiments of the electronic device.

Referring to FIGS. 13A to 14B, the electronic device 1300 may include a first housing 1310 (e.g., a first housing structure or a base housing), a second housing 1320 (e.g., a second housing structure or a slide housing) coupled to the first housing 1310 in a specific first direction (a direction of ①) and by a specific reciprocating distance, and a flexible display (e.g., an expandable display) 1330 disposed to be supported through at least a portion of the first housing 1310 and the second housing 1320. According to an embodiment, the electronic device 1300 may at least partially form the same plane as at least a portion of the first housing 1310 in a slide-out state, and may include a bendable member (or a bendable support member) at least partially received in the inner space of the second housing 1320 in a slide-in state. According to an embodiment, at least a portion of the flexible display 1330 may be supported by the bendable member in the slide-in state, while received into the inner space of the second housing 1320, such that the at least a portion of the flexible display 1330 is not viewed. According to an embodiment, at least a portion of the flexible display 1330 may be supported by the bendable support member at least partially forming the same plane as that of the first housing 1310, in the slide-out state, while viewed from the outside.

According to various embodiments, the electronic device 1300 may include a front surface 1300a (e.g., a first surface), a rear surface 1300b (e.g., a second surface) facing a direction opposite to a direction of the front surface 1300a, and a side surface surrounding a space between the front surface 1300a and the rear surface 1300b. According to an embodiment, the electronic device 1300 may include the first housing 1310 including a first side member 1311 and the second housing 1320 including a second side member 1321.

According to an embodiment, the first side member 1311 may include a first side surface 13111 having a first length in a first direction, a second side surface 13112 extending to have a second length longer than a first length in a direction substantially perpendicular to the first side surface 13111, and a third side surface 13113 extending in substantially parallel to the first side surface 13111 from the second side surface 13112 and having the first length. According to an embodiment, the first side member 1311 may be at least partially formed of a conductive material (e.g., metal). According to an embodiment, the first side member 1311 may include a first support member 1312 extending to at least a portion of the inner space of the first housing 1310. For example, the first side member 1311 may be integrally formed with the first support member 1312. For another example, the first support member 1312 may be formed separately from the first side member 1311 and coupled to the first side member 1311.

According to various embodiments, the second side member 1321 may include a fourth side surface 13211, which at least partially correspond to the first side surface 13111 and has a third length, a fifth side surface 13212, which extends in a direction substantially parallel to the second side surface 13112 from the fourth side surface 13211 and has a fourth length longer than the third length, and a sixth side surface 13213 which extends from the fifth side surface 13212 to correspond to the third side surface 13113 and has the third length. According to an embodiment, the second side member 1321 may be at least partially formed of a conductive material (e.g., metal). According to an embodiment, at least a portion of the second side member 1321 may include a second support member 1322 extending to at least a portion of an inner space of the second housing 1320. For example, the second side member 1321 may be integrally formed with the second support member 1322. For another example, the second support member 1322 may be formed separately from the second side member 1321 and coupled, directly or indirectly, to the second side member 1322.

According to an embodiment, the first side surface 13111 and the fourth side surface 13211 and/or the third side surface 13113 and the sixth side surface 13213 may be slidably coupled, directly or indirectly, to each other. According to an embodiment, as at least a portion of the first side surface 13111 may be overlapped with at least a portion of the fourth side surface 13211, the at least a portion of the first side surface 13111 is prevented or reduced from being viewed from the outside, in the slide-in state. According to an embodiment, as at least a portion of the third side surface 13113 may be overlapped with at least a portion of the sixth side surface 13213, the at least a portion of the third side surface 13113 is prevented or reduced from being viewed from the outside, in the slide-in state. According to an embodiment, at least a portion of the first support member 1312 may be overlapped with the second support member 1322 in the slide-in state, and a remaining portion of the first support member 1312 may be viewed from the outside. Accordingly, the first support member 1312 may include a non-overlap part 1312a which is not overlapped with the second support member 1322, and an overlap part 1312b overlapped with the second support member 1322. According to an embodiment, the non-overlap part 1312a and the overlap part 1312b may be integrally formed. According to an embodiment, the non-overlap part 1312a and the overlap part 1312b may be separately provided, and structurally coupled to each other.

According to various embodiments, the first housing 1310 may include a first sub-space 'A' corresponding to the non-overlap part 1312a and/or a second sub-space 'B' corresponding to the overlap part 1312b, in the first space. According to an embodiment, the first sub-space 'A' and the second sub-space 'B' may be at least partially connected to each other or separated from each other. According to an embodiment, the first sub-space 'A' may be formed to have a space volume greater than a space volume of the second sub-space 'B'. This is caused due to the overlap structure in which the second support member 1322 is overlapped with the first support member 1312, in the region corresponding to the second sub-space 'B'. According to an embodiment, the electronic device 1300 may include a plurality of electronic components (e.g., a camera module 1316, a sensor module 1317, a flash 1318, the main board (e.g., the main board 1350 of FIG. 15), or a battery (e.g., the battery 1351 of FIG. 15)) disposed in the first space of the first housing 1310. According to an embodiment, the first sub-space 'A' may be utilized as a region for disposing electronic components (e.g., the camera module 1316, the sensor module 1317, or the flash 1318) which requires a larger mounting apace, requires a thicker mounting thickness, or should operate while avoiding the overlap structure. According to an embodiment, the second sub-space 'B' may be utilized as a region for electronic components (e.g., the main board 1350 PCB of FIG. 15 or the battery (e.g., the battery 1351 of FIG. 15) requiring a smaller mounting space, requiring a thinner mounting thickness, or operating regardless of the overlap structure.

According to various embodiments, the front surface 1300a and the rear surface 1300b of the electronic device 1300 may have an area varied depending on the slide-in state or the slide-out state. According to an embodiment, the electronic device 1300 may include a first rear cover 1313 disposed in at least a part of the first housing 1310 and a second rear cover 1323 disposed on at least a portion of the second housing 1320, in the rear surface 1300b. According to an embodiment, the first rear cover 1313 and/or the second rear cover 1323 may be disposed in the manner of being coupled with the first support member 1312 and the second support member 1322.

According to an embodiment, the first rear cover 1313 may be formed integrally with the first side member 1311. For another example, the second rear cover 1323 may be formed integrally with the second side member 1321. According to an embodiment, the first rear cover 1313 and/or the second rear cover 1323 may be formed of a polymer, a coated or colored glass, a ceramic, a metal (e.g., aluminum, stainless steel (STS), or magnesium), or a combination of at least two of the materials. According to an embodiment, the first rear cover 1313 may extend to at least a portion of the first side member 1311. According to an embodiment, the second rear cover 1323 may extend to at least a portion of the second side member 1321. According to an embodiment, at least an extension portion of the first side member 1311 of the first rear cover 1313 may be formed in a curved surface. According to an embodiment, at least an extension portion of the second side member 1321 of the second rear cover 1323 may be formed in a curved surface. According to an embodiment, at least a portion of the first support member 1312 may be substituted with the first rear cover 1313, and at least a portion of the second support member 1322 may be substituted with the second rear cover 1323.

According to various embodiments, the electronic device 1300 may include the flexible display 1330 disposed to be supported by at least a portion of the first housing 1310 and the second housing 1320. According to an embodiment, the flexible display 1330 may include a first part 1330*a* (e.g., a plan part) constantly viewed from the outside and a second part 1330*b* (e.g., a bendable part) that extends from the first part 1330*a* and at least partially slides in the inner space of the second housing 1320 such that the second part 1330*b* is not viewed in the slide-in state. According to an embodiment, the first part 1330*a* may be disposed to be supported by the first housing 1310, and the second part 1330*b* may be disposed to be at least partially supported by a bendable member. According to an embodiment, at least a portion of the second part 1330*b* of the flexible display 1330 may extend from the first part 1330*a* while being supported by the bendable member in the state that the first housing 1310 slides out in a specific first direction (the direction of ①), and may form the substantially same plane as the first part 1330*a* while being viewed from the outside. According to an embodiment, at least a portion of the second part 1330*b* of the flexible display 1330 may be disposed to slide in the inner space of the second housing 1320 such that the at least a portion of the second part 1330*b* is not viewed from the outside, in the state that the first housing 1310 slides in the specific second direction (the direction of ②). Therefore, in the electronic device 1300, as the first housing 1310 slidably moves in the specific direction from the second housing 1320, the display area of the flexible display 1330 may be varied.

According to various embodiments, the first housing 1310 and the second housing 1320 may be operated in a sliding manner with respect to each other, to be varied in whole width. According to an embodiment, the electronic device 1300 may be, in a slide-in state, configured to have a first width W1 from the second side surface 13112 to the fourth side surface 13211. According to an embodiment, the electronic device 1300 may be, in a slide-out state, configured to have a third width W3 greater than the first width W1 by moving a portion of the bendable member sliding in the inner space of the second housing 1320. For example, the flexible display 1330 may have a display area substantially corresponding to the first width W1, in the slide-in state, and may have an expanded display area substantially corresponding to the third width W3, in the slide-out state.

According to various embodiments, the slide-out operation of the electronic device 1300 may be performed through a user operation. For example, the electronic device 1300 may be shifted from the slide-out state to the slide-in state through an operation of the flexible display 1330 pushed in a specified first direction (the direction of ①) through the handling of the user. According to an embodiment, the electronic device 1300 may be shifted from the slide-in state to the slide-out state through an operation of the flexible display 1330 pushed in a specified second direction (the direction of ②) through the handling of the user. According to an embodiment, the electronic device 1300 may maintain the slide-in state and the slide-out state, as the first housing 1310 is pressed from the second housing 1320 in a slide-in direction or a slide-out direction from a specific inflection point. According to an embodiment, the electronic device 1300 may be configured to allow the first housing 1310 to slide out in a specific first direction (e.g., the direction of ①) by handling a locker exposed through the rear surface 1300*b* of the electronic device 1300. According to an embodiment, the electronic device 1300 may automatically operate through a driving mechanism (e.g., a driving motor, a deceleration module, and/or a gear assembly) disposed in an inner space of the first housing 1310 and/or the second housing 1320. According to an embodiment, the electronic device 1300 may be set to control the operation of the second housing 1320 through the driving mechanism, when an event for the transition between the slide-in state/slide-out state is detected through the processor (e.g., the processor 120 of FIG. 1). According to an embodiment, the processor (e.g., the processor 120 of FIG. 1) of the electronic device 1300 may control the flexible display 1330 to display an object and execute an application program in a various manners, to correspond to the changed display area of the flexible display 1330, depending on the slide-in state, slide-out state, or the intermediate state (e.g., a free-stop state is included). For example, the intermediate state may refer to the intermediate state between the slide-in state and the slide-out state. For example, the state changed to the slide-out state from the slide-in state may be referred to as the intermediate state. For another example, the state changed to the slide-in state from the slide-out state may be referred to as the intermediate state.

According to various embodiments, the electronic device 1300 may include at least one of an input device 1303, sound output devices 1306 and 1307, sensor modules 1304 and 1317, camera modules 1305 and 1316, a connector port 1308, a key input device 1319, or an indicator (not illustrated). According to an embodiment, the electronic device 1300 may be configured such that at least one of the above-described components is omitted or other components are additionally included.

According to various embodiments, the input device 1303 may include a microphone. According to an embodiment, the input device 1303 may include a plurality of microphones disposed to sense the direction of sound. The sound output devices 1306 and 1307 may include speakers. The sound output devices 1306 and 1307 may include the call receiver 1306 and the external speaker 1307. According to an embodiment, the external speaker 1307 may be disposed in the second housing and configured to transmit sound to the outside through a first speaker hole 1307*a*. According to an embodiment, the external speaker 1307 is disposed in the inner space of the second housing 1320, thereby providing high-quality sound to the user regardless of the sliding operation of the first housing 1310. According to an embodiment, the connector port 1308 may be disposed in the inner space of the second housing 1320 together with the external speaker 1307. According to an embodiment, the connector port 1308 may be disposed in the inner space of the first housing 1310 and may face the outside through a connector port hole (not illustrated) formed in the second housing 1320, in the slide-in state. In this case, the connector port 1308 may be configured to be covered to be prevented or reduced from being viewed from the outside through the second housing 1320, in the slide-in state. According to an embodiment, the receiver 1306 may be configured to correspond to an external environment in the inner space of the first housing 1310. In this case, the first housing may include a sound output hole. According to an embodiment, the sound output hole may maintain sound output performance and may be covered to be prevented or reduced from being viewed from the outside through at least a portion of the second housing 1320. According to an embodiment, the sound output devices 1306 and 1307 may include a speaker (e.g., a piezo-speaker) operating in the state that a separate speaker hole is excluded.

According to an embodiment, the sensor modules 1304 and 1317 may generate an electrical signal or a data value that corresponds to an internal operation state or an external environment state of the electronic device 1300. The sensor modules 1304 and 1317 may include, for example, the first sensor module 1304 (e.g., a proximity sensor or an illuminance sensor) disposed on the front surface 1300*a* of the electronic device 1300 and/or the second sensor module 1317 disposed on the rear surface 1300*b* of the electronic device 1300. According to an embodiment, the first sensor module 1304 may be disposed under the flexible display 1330, on the front surface 1300*a* of the electronic device 1300. According to an embodiment, the first sensor module 1304 and/or the second sensor module 1317 may include at least one of a proximity sensor, an illuminance sensor, a time of flight (TOF) sensor, an ultrasonic sensor, a fingerprint recognition sensor, a gesture sensor, a gyro sensor, a pressure sensor, a magnetic sensor, an acceleration sensor, a grip sensor, a color sensor, an infrared (IR) sensor, a biometrics sensor, a temperature sensor, or a humidity sensor.

According to various embodiments, the camera modules 1305 and 1316 may include the first camera module 1305 disposed on the front surface 1300*a* of the electronic device 1300 and the second camera module 1316 disposed on the rear surface 1300*b* of the electronic device 1300. According to an embodiment, the electronic device 1300 may include a flash 1318 positioned in the vicinity of the second camera module 1316. According to an embodiment, the camera modules 1305 and 1316 may include at least one lens, an image sensor, and/or an image signal processor. According to an embodiment, the first camera module 1305 may be disposed under the flexible display 1330 and may be configured to photograph a subject through a portion of the active region of the flexible display 1330. According to an embodiment, the flash 1318 may include, for example, a light emitting diode or a xenon lamp.

According to various embodiments, the first camera module 1305 of the camera modules 1305 and 1316 and/or some sensor modules 1304 of the sensor modules 1304 and 1317 may be disposed to make contact with the external environment through an opening or a transmission region formed through the flexible display 1330, in the inner space of the electronic device 1300. According to an embodiment, a region, which faces the first camera module 1305, of the flexible display 1330 may include a transmission region having a specified transmittance while serving as a portion of a region displaying content. According to an embodiment, the transmission region may be formed to have a transmittance in the range of about 5% to about 20%. Such a transmission region may include a region overlapped with an effective region (e.g., a viewing angle region), which is to transmit light for forming an image on an image sensor, of the first camera module 1305. For example, the transmission region of the flexible display 1330 may include a region lower in pixel density and/or wiring density, as compared to the surrounding region. For example, the transmission region may be substituted with the above-described opening.

For example, some camera modules 1305 may include an under display camera (UDC). According to some embodiments, some sensor modules 1304 may be disposed to perform the intrinsic functions thereof in the inner space of the electronic device 1300, without being visually exposed through the flexible display 1330. According to an embodiment, the second camera module 1316 of the camera modules 1305 and 1316 and/or the sensor module 1317 of the sensor modules 1304 and 1317 may be disposed in the inner space of the electronic device 1300 to correspond to the external environment through at least a portion of the first housing (e.g., the first rear cover 1313). In this case, the second camera module and/or the sensor module 1317 may be disposed at a specific position of the first housing 1310 that is constantly viewed from the outside, regardless of the slide-in state and/or the slide-out state.

Figure 15:
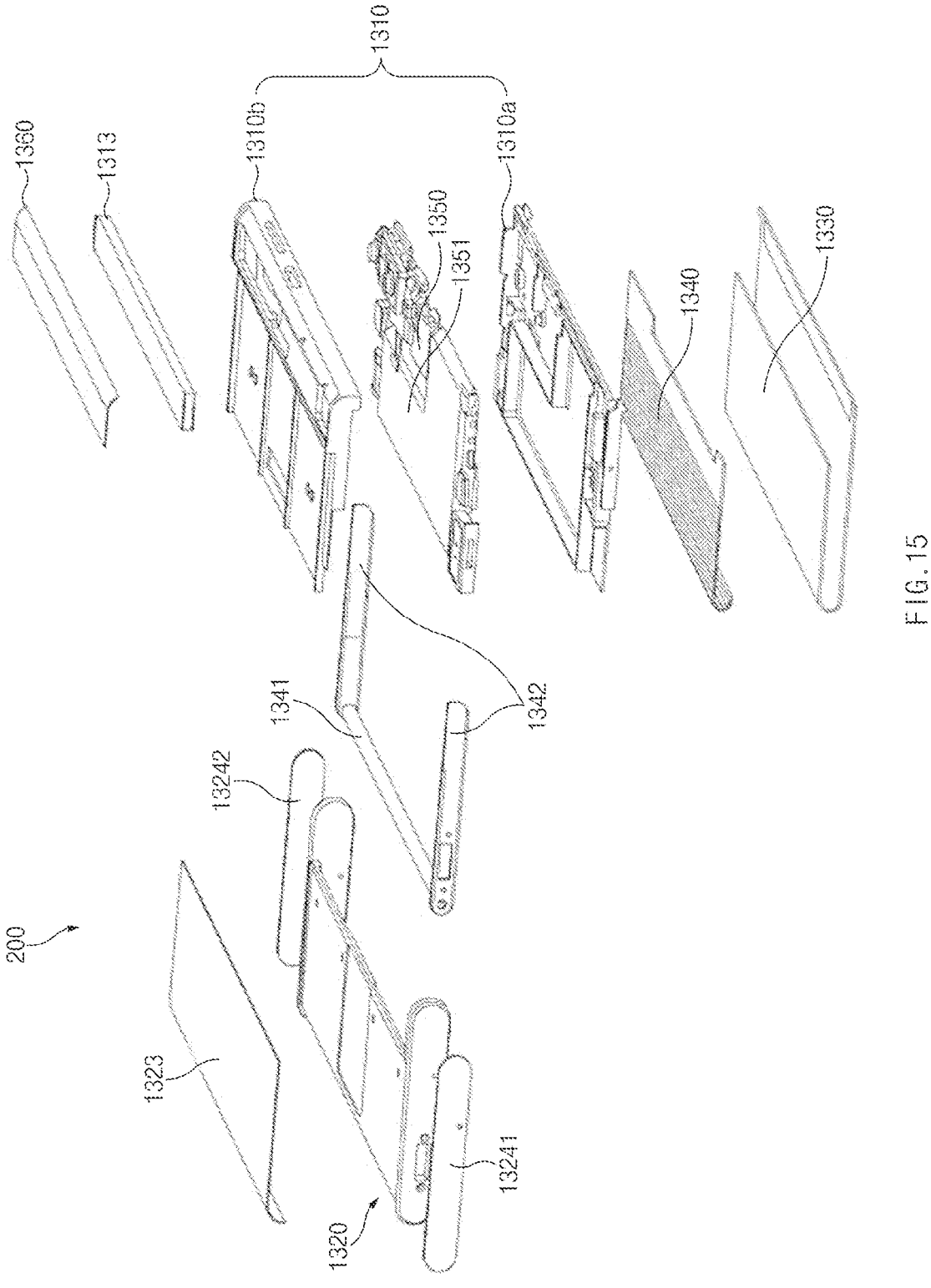
FIG. 15 is an exploded perspective view of an electronic device, according to certain example embodiments.

FIG. 15 is an exploded perspective view of an electronic device, according to certain example embodiments.

Referring to FIG. 15, the electronic device 1300 may include the first housing 1310 including a first space, the second housing 1320 slidably coupled with the first housing 1310 and including a second space, a bendable member 1340 disposed to be at least partially rotatable in the second space, the flexible display 1330 disposed to be supported by at least a portion of the bendable member 1340 and the first housing 1310, and at least one slide hinge module 1360 pressing the first housing 1310 in the slide-in direction and/or slide-out direction from the second housing 1320. According to an embodiment, the hinge module 1360 may include a motor for moving a partial region of the display into and/or out of the housing. According to an embodiment, the first space of the first housing 1310 may be provided through the coupling of a first bracket housing 1310*a* (e.g., the front bracket housing) and a second bracket housing 1310*b* (e.g., the rear bracket housing). According to some embodiments, at least a portion of the first bracket housing 1310*a* and/or the second bracket housing 1310*b* may include at least a portion of the first side member 1311 or the first support member 1312 (e.g., the first support member 1312 of FIG. 3B), or may be substituted with the first support member 1312. According to an embodiment, the electronic device 1300 may include a main substrate 1350 disposed in the first space. According to an embodiment, the electronic device 1300 may include a camera module (e.g., the camera module 1316 of FIG. 3B) or a sensor module (e.g., the sensor module 1317 of FIG. 3B) disposed in the first space. According to an embodiment, the bendable member 1340 may be disposed to have one end fixed to the first housing 1310 and an opposite end received at least partially to be rotatable in the second space of the second housing 1320. According to an embodiment, the bendable member 1340 may include a plurality of multi-bars rotatably connected, directly or indirectly, to each other. According to an embodiment, the bendable member 1340 may be supported through a shaft-shaped support member 1341 disposed in the second space. According to an embodiment, the support member 1341 may include a support roller rotatably disposed in the second space. According to some embodiments, the electronic device 1300 may include a tension providing member which is disposed in the inner space of the electronic device 1300 and provides tension that prevents or reduces the flexible display 1330 from sagging during movement by supporting the rear surface of the bendable member 1340. According to an embodiment, the tension providing member may include a tension belt including a metal material.

According to various embodiments, the bendable member 1340 may be at least partially received in the second space, in the slide-in state, and may at least partially slide out of the second space to form substantially the same plane as the first housing 1310, in the slide-out state. Accordingly, the display area of the flexible display 1330 supported by the first housing 1310 and the bendable member 1340 may be varied depending on the sliding operation. According to an embodiment, the electronic device 1300 may further include a guide rail 1342 disposed on side surfaces of the first bracket housing 1310a and the second bracket housing 1310b, which are coupled, directly or indirectly, to each other, and guided to the inner space of the second housing 1320. According to some embodiments, the electronic device 1300 may include at least one cover member 13241 or 13242 disposed on opposite side surfaces of the second support member (e.g., the second support member 1322 of FIG. 3B) of the second housing 1320. According to an embodiment, at least one cover member 13241 and 13242 may include the first cover member 13241 disposed to at least partially cover the fourth side surface (e.g., the fourth side surface 13211 of FIG. 2A) of the second housing 1320 and the second cover member 13242 disposed to at least partially cover the sixth side surface 13213 (e.g., the sixth side surface 13213 of FIG. 2A) of the second housing 1320.

According to an example embodiment, a method for operating an electronic device (e.g., the electronic device 101 of FIG. 1, the electronic device 200 of FIG. 2, the electronic device 300 of FIG. 3, the electronic device 400 of FIG. 4, or the electronic device 1300 of FIGS. 13 to 15) including a display (e.g., the display module 160 of FIG. 1, the display 220 of FIG. 2, or the display 310 of FIG. 3) including a region movable out of or into a housing by using a motor (e.g., the motor 210 of FIG. 2 or the motor 330 of FIG. 3) may include executing an application (e.g., the application 146 of FIG. 1 or the application 401 of FIG. 4), moving the region of the display to the outside of the housing at a specific reference speed by using the motor, in response to a specific event, recognizing a time required to display the execution screen of the application on the display, during the movement of the region, adjusting the speed of the motor based on the required time, and displaying the execution screen of the application, which corresponds to the state of the display, on the display, while moving the region based on the adjusted speed of the motor.

According to an embodiment, the method may include adjusting the size of the frame buffer for the application, based on the state in which the region of the display is moved.

Each embodiment herein may be used in combination with any other embodiment(s) described herein.

According to an embodiment, the required time may include at least one of a time required to determine the sizes of views included in the execution screen of the application, a time required to determine the layout of the views, and a time required to draw the execution screen into a frame buffer for the application, based on the determined view and the determined layout.

According to an embodiment, the recognizing of the required time may include recognizing a time required to display the execution screen for each activity of the application, and storing, in the memory of the electronic device, information on the time required to display the execution screen for each activity.

According to an embodiment, the time required to display the execution screen for each activity may include a time required when an execution screen corresponding to the activity is first drawn, a time required to change at least a portion of the execution screen corresponding to the latest activity, and an average value of times accumulated, which are required to change at least a portion of the execution screen corresponding to the activity.

According to an embodiment, the adjusting of the speed of the motor may include adjusting the speed of the motor, based on the time required to display the execution screen corresponding to the activity, which is currently executed, of activities included in the application.

According to an embodiment, the adjusting of the speed of the motor may include adjusting the speed of the motor in the range of a specific maximum or high motor speed and a specific minimum or low motor speed.

According to an embodiment, the method may include adding up times required to display execution screens of a plurality of applications and adjusting the speed of the motor based on the added-up time, while executing the plurality of applications through the multi-window.

According to an embodiment, the controlling of the speed of the motor may include controlling the speed of the motor, based on performance information previously stored in the application.

According to an embodiment, the controlling of the speed of the motor may include adjusting the speed of the motor, based on at least one of the performance of the processor, the communication state of the electronic device, and an available capacity of the memory of the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with certain example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a housing including a first housing and a second housing movably coupled to the first housing;
   a motor;
   a flexible display supported by at least a portion of the first housing and/or the second housing and including a movable region configured to be exposed to an outside of the housing and/or accommodated in an inner space of the housing via at least the motor based on a state of the electronic device;
   at least one processor comprising processing circuitry and operatively connected with the motor and the display,
   wherein the at least one processor, individually or collectively, is configured to:
   identify a specific event for moving the movable region of the flexible display while an application is executed;
   move the movable region of the display to be exposed to the outside of the housing at a specific reference speed by using at least the motor, in response to identifying the specific event;
   recognize a time required to generate an execution screen of the application corresponding to a region of the display exposed to the outside of the housing while moving the movable region;
   adjust a speed of the motor, based on the required time; and
   display the execution screen of the application on the region of the display exposed to the outside of the housing, while moving the movable region at the adjusted speed of the motor.

2. The electronic device of claim 1, wherein the at least one processor, individually or collectively, is configured to:
   adjust a size of a frame buffer for the application, based on a state in which the movable region of the display is moved.

3. The electronic device of claim 1, wherein the required time includes:
   at least one of a time required to determine sizes of views included in the execution screen of the application, a time required to determine a layout of the views, and a time required to draw the execution screen into a frame buffer for the application based on the determined view and the determined layout.

4. The electronic device of claim 1, wherein the at least one processor, individually or collectively, is configured to:
   recognize a time required to generate the execution screen for each activity of the application; and
   store, in memory, information on the time required to generate the execution screen for each activity.

5. The electronic device of claim 4, wherein the time required to generate the execution screen for the each activity includes:
   a time required when the execution screen corresponding to the activity is first drawn;
   a time required to change at least a portion of the execution screen corresponding to the latest activity; and
   an average value of times accumulated, which are required to change at least a portion of the execution screen corresponding to the each activity.

6. The electronic device of claim 4, wherein the at least one processor, individually or collectively, is configured to:
   adjust the speed of the motor, based on the time required to generate the execution screen corresponding to the activity, which is currently executed, of activities included in the application.

7. The electronic device of claim 1, wherein the at least one processor, individually or collectively, is configured to:

adjust the speed of the motor to be in a range of a specific maximum motor speed and a specific minimum motor speed.

8. The electronic device of claim 1, wherein the at least one processor, individually or collectively, is configured to:

add up times required to generate execution screens of a plurality of applications, while executing the plurality of applications through a multi-window, and adjust the speed of the motor, based on the added-up time.

9. The electronic device of claim 1, wherein the at least one processor, individually or collectively, is configured to:

control the speed of the motor, based on performance information previously stored in the application.

10. The electronic device of claim 1, wherein the at least one processor, individually or collectively, is configured to:

adjust the speed of the motor, based on at least one of performance of the at least one processor, a communication state of the electronic device, and an available capacity of memory of the electronic device.

11. A method for operating an electronic device including a flexible display including a region movable configured to be exposed an outside of a housing and/or accommodated in an inner space of the housing via at least a motor based on a state of the electronic device, the method comprising:

executing an application;

moving the movable region of the display to be exposed to the outside out of the housing at a specific reference speed via the motor, in response to a specific event for moving the movable region of the display;

recognizing a time required to generate an execution screen of the application on corresponding to a region of the display exposed to the outside of the housing, while moving the movable region;

adjusting a speed of the motor based on the required time; and displaying the execution screen of the application on the region of the display exposed to the outside of the housing, while moving the movable region at the adjusted speed of the motor.

12. The method of claim 11, wherein a size of a frame buffer for the application is adjusted, based on a state in which the movable region of the display is moved.

13. Method of claim 11, wherein the required time includes:

at least one of a time required to determine sizes of views included in the execution screen of the application;

a time required to determine a layout of the views; and a time required to draw the execution screen into a frame buffer for the application, based on the determined view and the determined layout.

14. The method of claim 11, wherein the recognizing of the required time includes:

recognizing a time required to generate the execution screen for each activity of the application; and storing information on a time to generate the execution screen for the each activity in a memory of the electronic device.

15. The method of claim 14, wherein the time required to generate the execution screen for the each activity includes:

a time required when the execution screen corresponding to the activity is first drawn;

a time required to change at least a portion of the execution screen corresponding to the latest activity; and an average value of times accumulated, which are required to change at least a portion of the execution screen corresponding to the activity.

16. The method of claim 14, wherein the adjusting of the speed of the motor includes:

adjusting the speed of the motor, based on the time required to generate the execution screen corresponding to the activity, which is currently executed, of activities included in the application.

17. The method of claim 11, wherein the adjusting of the speed of the motor includes:

adjusting the speed of the motor to be in a range of a specific maximum motor speed and a specific minimum motor speed.

18. The method of claim 11, further comprising:

adding up times required to generate execution screens of a plurality of applications, while executing the plurality of applications through a multi-window, and adjusting the speed of the motor, based on the added-up time.

19. The method of claim 11, wherein the controlling of the speed of the motor includes:

controlling the speed of the motor, based on performance information previously stored in the application.

20. The method of claim 11, wherein the controlling of the speed of the motor includes:

adjusting the speed of the motor, based on at least one of performance of at least one processor of the electronic device, a communication state of the electronic device, and an available capacity of memory of the electronic device.

21. An electronic device comprising:

a housing including a first housing and a second housing movably coupled to the first housing;

a motor;

a flexible display supported by at least a portion of the first housing and/or the second housing and including a movable region configured to be exposed to an outside of the housing and/or accommodated in an inner space of the housing via at least the motor based on a state of the electronic device;

at least one processor comprising processing circuitry and operatively connected with the motor and the display, wherein the at least one processor, individually or collectively, is configured to:

identify a specific event for moving the movable region of the flexible display while an application is executed;

recognize a time required to generate an execution screen of the application corresponding to a region of the display exposed to the outside of the housing while moving the movable region;

determine a speed of the motor, based on the required time; and display the execution screen of the application on the region of the display exposed to the outside of the housing, while moving the movable region at the determined speed of the motor.

* * * * *